United States Patent
Holenstein et al.

(10) Patent No.: US 12,516,281 B2
(45) Date of Patent: Jan. 6, 2026

(54) CELL ISOLATION DEVICE AND METHOD

(71) Applicant: CUTISS AG, Schlieren (CH)

(72) Inventors: Claude Nicolas Holenstein, Zürich (CH); Vincent Ronfard, Villarzel (CH); Anna-Lena Dittrich, Zumikon (CH); Reto Frei, Turgi (CH); Christian Stefan Wullschleger, Zürich (CH); Jascha Eisenberg, Wettingen (CH); Sebastian Wollmann, Nussbaumen (CH)

(73) Assignee: CUTISS AG, Schlieren (CH)

( * ) Notice: Subject to any disclaimer, the term of this patent is extended or adjusted under 35 U.S.C. 154(b) by 677 days.

(21) Appl. No.: 17/759,563

(22) PCT Filed: Feb. 5, 2021

(86) PCT No.: PCT/IL2021/050140
§ 371 (c)(1),
(2) Date: Jul. 27, 2022

(87) PCT Pub. No.: WO2021/156872
PCT Pub. Date: Aug. 12, 2021

(65) Prior Publication Data
US 2023/0101666 A1 Mar. 30, 2023

Related U.S. Application Data

(60) Provisional application No. 62/970,773, filed on Feb. 6, 2020.

(51) Int. Cl.
*C12M 1/36* (2006.01)
*A61B 10/00* (2006.01)
(Continued)

(52) U.S. Cl.
CPC ......... *C12M 41/48* (2013.01); *A61B 10/0096* (2013.01); *A61B 10/02* (2013.01); *C12N 5/06* (2013.01)

(58) Field of Classification Search
CPC ...... C12M 41/48; C12M 45/00; C12M 45/02; C12M 45/06; C12M 45/09; C12N 5/06; A61B 10/0096; A61B 10/02
See application file for complete search history.

(56) References Cited

U.S. PATENT DOCUMENTS

2008/0113426 A1* 5/2008 Smith ............... C12M 21/08
435/286.5
2014/0315303 A1 10/2014 Huang
(Continued)

FOREIGN PATENT DOCUMENTS

| WO | WO 2019/106207 A9 | 6/2019 |
| WO | WO 2019/232504 A2 | 12/2019 |
| WO | WO 2020/245818 A1 | 12/2020 |

OTHER PUBLICATIONS

PCT International Search Report and Written Opinion, PCT Application No. PCT/IL2021/050140, May 13, 2021, 20 pages.

*Primary Examiner* — Michael L Hobbs
(74) *Attorney, Agent, or Firm* — Fenwick & West LLP

(57) ABSTRACT

The present invention relates to a device and method for automatically isolating viable cells from connective, epithelial or other tissue, and, if the tissue is multilayered, for automatically separating one tissue layer from another.

21 Claims, 33 Drawing Sheets

(51) Int. Cl.
*A61B 10/02* (2006.01)
*C12N 5/07* (2010.01)

(56) References Cited

U.S. PATENT DOCUMENTS

| | | |
|---|---|---|
| 2015/0004702 A1 | 1/2015 | Raj et al. |
| 2015/0152375 A1* | 6/2015 | Hedrick ................ C12M 29/04 |
| | | 435/283.1 |
| 2019/0376084 A1 | 12/2019 | Crisman et al. |

* cited by examiner

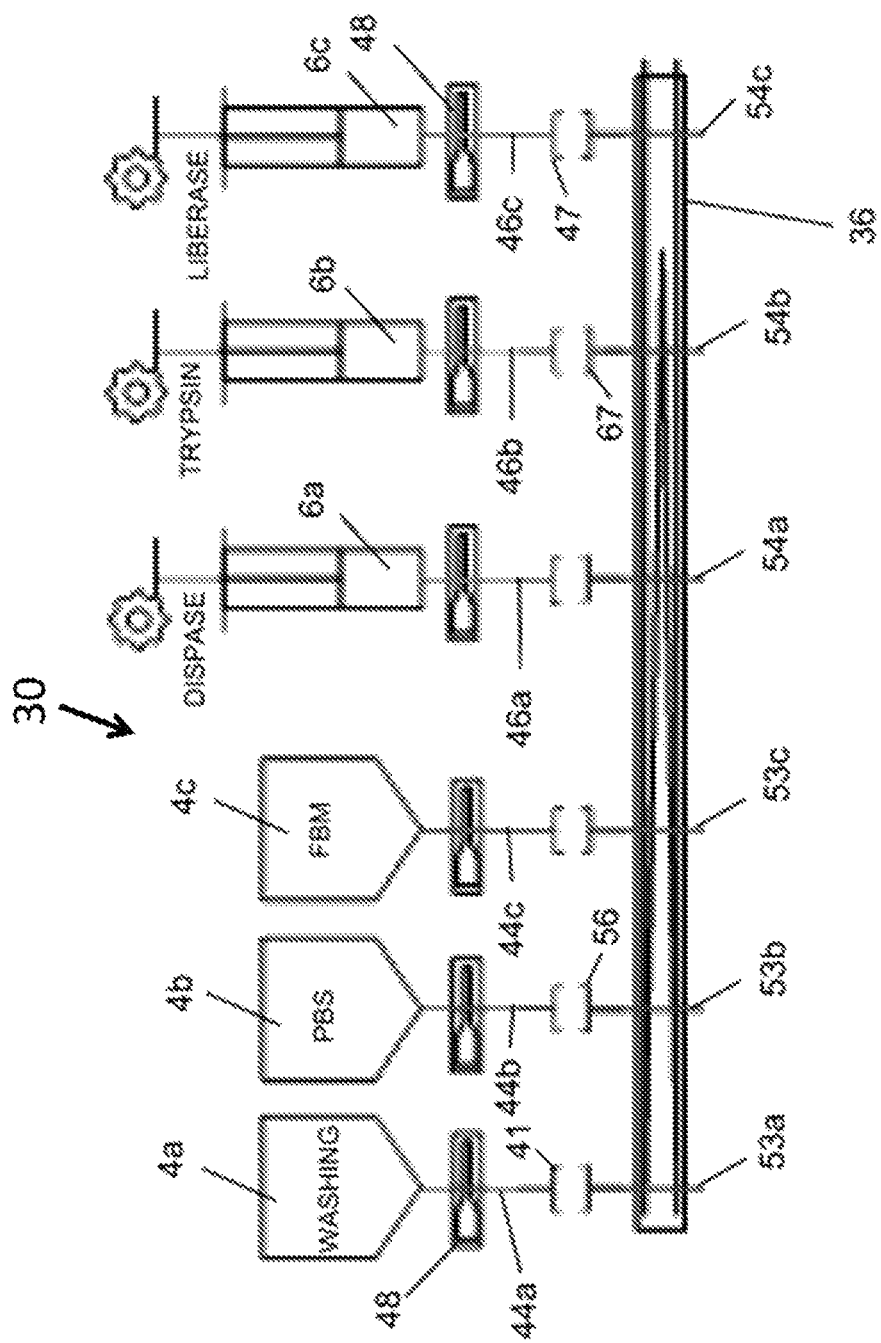

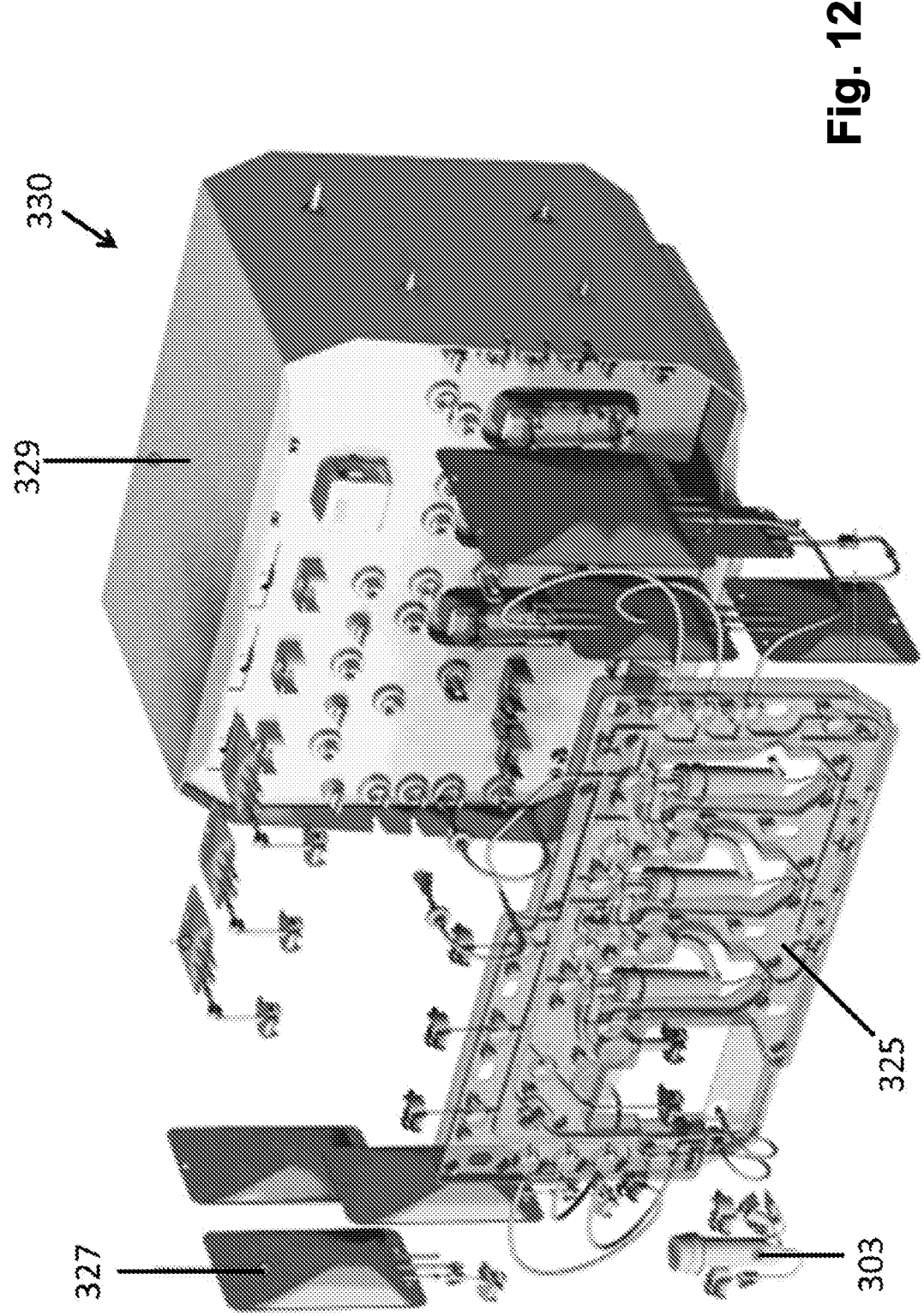

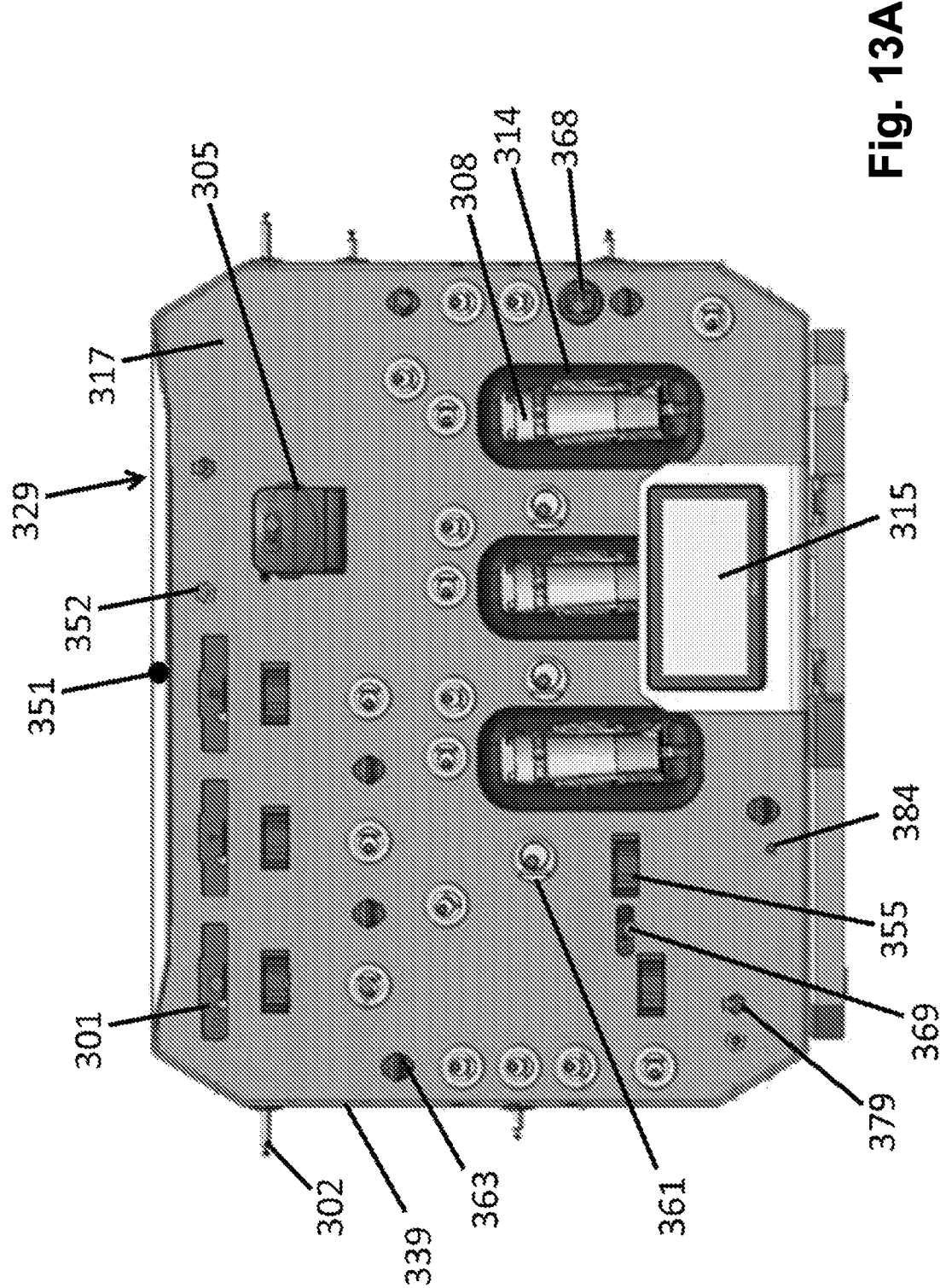

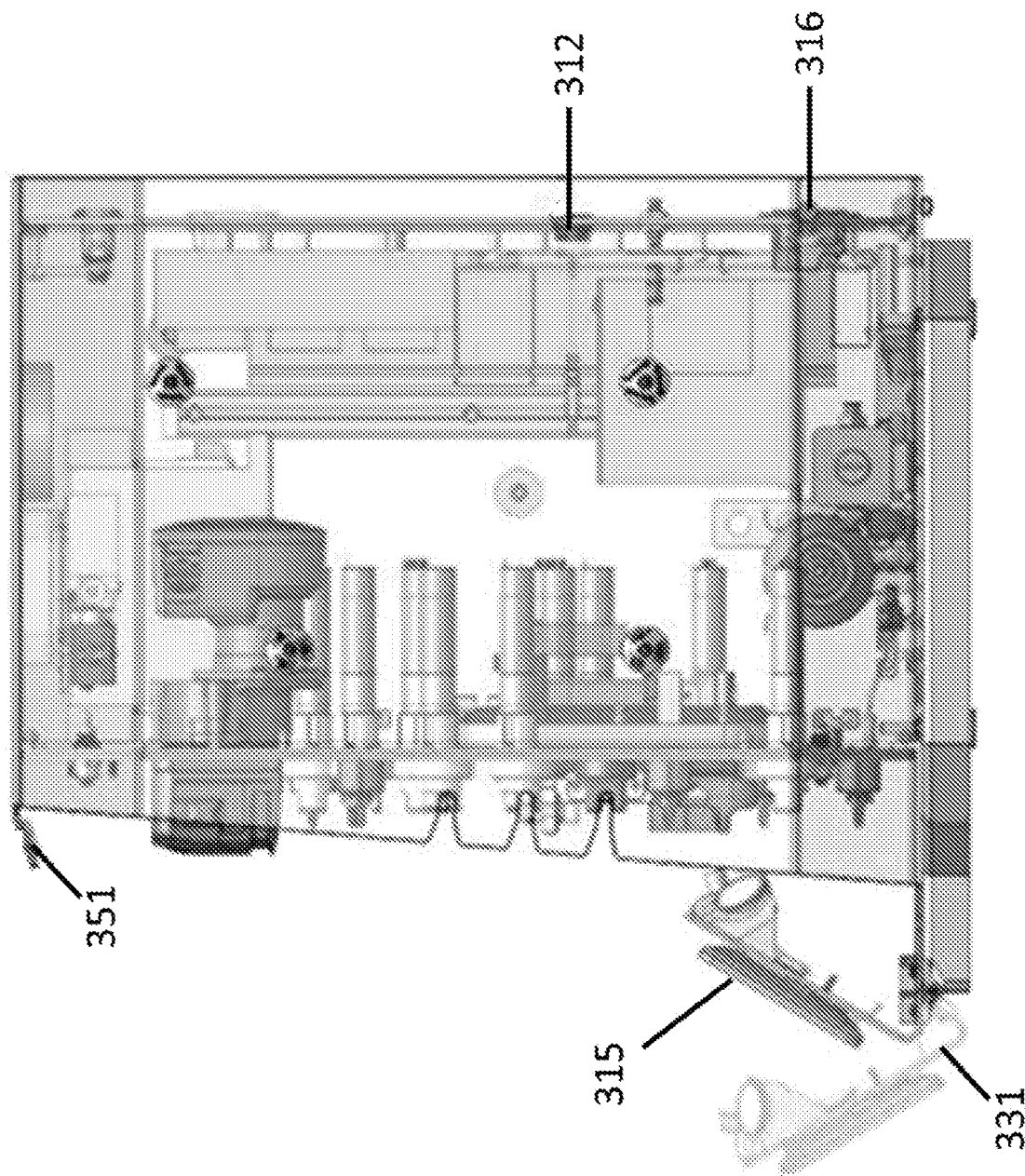

CELL ISOLATION DEVICE AND METHOD

FIELD OF THE INVENTION

The present invention relates to the field of medical devices and laboratory equipment for regenerative medicine. More particularly, the invention relates to a device and method for automatically isolating viable cells from connective, epithelial or other tissue, and, if the tissue is multilayered, for automatically separating one tissue layer from another.

BACKGROUND OF THE INVENTION

Many cell therapies such as Chimeric antigen receptor T-cells (CAR-T) therapy, tissue engineered products (TCP), production of pharmaceutical products and other research projects are contingent upon cell isolation, or the reliable separation of cells from human or animal tissue, particularly connective or epithelial tissue, in order to investigate for example the biological reaction of a specific cell type to a disease or to a drug.

Cell isolation is a time consuming procedure, requiring a large number of manual operations. Human intervention is a potential source of error and also incurs additional expenses due the cost of manpower.

An automatically operable cell isolation device has not been considered heretofore due the large number of different operations that are needed for each type of tissue that is extracted. A cell isolation device that is specific for each type of tissue to be extracted is economically infeasible. Furthermore, a good manufacturing practices (GMP)-compliant process is needed in the field of regenerative medicine in order to provide a therapy in a safe, reliable and controlled manner.

It is an object of the present invention to provide a cell isolation device and method that minimize, or do not require any, human intervention.

It is an additional object of the present invention to provide a cell isolation device and method that reliably isolate cells from connective, epithelial or other tissue, whether single-layered or multilayered tissue.

It is an additional object of the present invention to provide a cell isolation device that can be used for many different types of tissue.

It is yet an additional object of the present invention to improve the cell isolation yield in a safe and consistent process.

It is yet an additional object of the present invention to provide a cell isolation device that is completely aseptically closed and its interior components are disposable to restrict contamination and to support operation in a low-grade cleanroom class.

It is yet an additional object of the present invention to provide a cell isolation device with a disposable unit that facilitates simplified cleaning and qualification for each patient and restricts cross-contamination, thus increasing safety of the process.

Other objects and advantages of the invention will become apparent as the description proceeds.

SUMMARY OF THE INVENTION

An automatically operable cell isolation device comprises a liquid distribution unit that includes a plurality of separate liquid containers; a biopsy kit by which a sample of tissue is extractable; a main disposable unit configured to cooperate with one or more process containers and with a valve array; and one or more final product bags for receiving isolated cells, wherein a first portion of said valve array interfaces between said biopsy kit and one of said process containers, a second portion of said valve array interfaces between said liquid distribution unit and said one or more process containers, and a third portion of said valve array interfaces between said one or more process containers and said one or more final product bags, wherein said valve array is configurable to effect a desired cell isolation procedure.

A method for automatically performing a cell isolation procedure comprises providing a housing in which are mounted a plurality of electrical or electronic components configured to effect a desired cell isolation procedure; securely coupling a carrier, in which a tube system through which one or more isolation agents for isolating extracted tissue is flowable is encapsulated, with the housing, such that the tube system is selectively set in communication by error-free fashion with the plurality of electrical or electronic components after the carrier is coupled with the housing; introducing a tissue sample into a tube of the tube system; selecting a desired protocol for performing a cell isolation procedure by means of one of the electronic components; and performing the cell isolation procedure by sequentially operating the plurality of electrical or electronic components until the one or more isolation agents flows through the tube system and sufficiently acts on the introduced extracted tissue to isolate a cell population residing in the introduced extracted tissue to a single cell level.

In one aspect, the present invention provides an automatically operable cell isolation device, comprising:
  a) a liquid distribution unit that includes a plurality of separate liquid containers;
  b) a biopsy kit by which a sample of tissue is extractable;
  c) a main disposable unit configured to cooperate with one or more process containers and with a valve array; and
  d) one or more final product bags for receiving isolated cells,
  e) wherein a first portion of said valve array interfaces between said biopsy kit and one of said process containers, a second portion of said valve array interfaces between said liquid distribution unit and said one or more process containers, and a third portion of said valve array interfaces between said one or more process containers and said one or more final product bags, wherein said valve array is configurable to effect a desired cell isolation procedure.

According to one embodiment of the invention, the cell isolation device further comprises a valve controller for facilitating selective actuation of each valve of the valve array to achieve a desired valve configuration.

According to another embodiment of the invention, the cell isolation device further comprises means for generating fluid flow and tissue transfer between the biopsy kit and the one or more process containers or between the one or more process containers and the one or more final product bags in conjunction with the desired valve configuration.

According to a further embodiment, the cell isolation device further comprises a sequencer module in data communication with the valve controller and the fluid generating means for facilitating selective actuation of each valve of the valve array and of the fluid generating means in each step of a sequence of the desired cell isolation procedure.

In yet another embodiment of the invention, the cell isolation device further comprises a software module in data communication with the sequencer module for generating a user interface by which one of a plurality of cell isolation procedure sequences are selectable.

In yet a further embodiment of the invention, the main disposable unit comprises a disposable tube system for being in fluid communication with each of the first, second and third portions of the valve array through which liquid discharged from the liquid distribution unit is selectively flowable.

In some embodiments of the invention, the cell isolation device further comprises a housing in which are mounted a plurality of electrical or electronic components including the valve array which are configured to effect the desired cell isolation procedure.

In a specific embodiment of the invention, the main disposable unit is a carrier in which the tube system is encapsulated and which is adapted to be securely coupled in error-free fashion with a front panel of the housing such that the tube system is set in fluid communication with each of the first, second and third portions of the valve array.

In another specific embodiment of the invention, the main disposable unit comprises a plurality of aseptic connectors, to each corresponding aseptic connector one of the biopsy kit and the liquid containers is connectable.

In one embodiment of the invention, the plurality of liquid containers, the one or more process containers, the one or more final product bags, and each tube of the tube system are made of a sterile and biocompatible material.

In another embodiment of the invention one of the liquid containers is prefilled with a washing solution, the cell isolation device being operable to flush tissue debris remaining in the biopsy kit, the one or more process containers, or each of the tubes with the washing solution.

According to some embodiments of the invention, at least one of the liquid containers is prefilled with an isolation agent or with a separation agent.

In a specific embodiment of the invention, the cell isolation device further comprises a shaker device that is kinematically connected with a corresponding one of the one or more process containers.

In another specific embodiment of the invention, said shaker device comprises a holder by which the corresponding process container is held, a rod about which said holder is pivotable, an appendage protruding from said holder, and means for applying a driving force to said appendage that causes said holder to rotate in a similar direction about said rod and to shake liquid contained within the corresponding process container.

In yet another specific embodiment of the invention, the rod is substantially horizontally disposed and is connected to resilient means that induces precessional motion during pivoting displacement of the holder.

According to a further embodiment of the invention, the means for applying a driving force comprises eccentric rotatably driven means protruding through an aperture formed in the appendage, wherein said driven means is configured to forcibly contact a wall of the aperture and to apply the driving force to the appendage.

In yet a further embodiment of the invention, the cell isolation device further comprises a shaker controller in data communication with both of the shaker device and the sequencer module to facilitate selective operation of the shaker device and to facilitate performance of the desired cell isolation procedure.

In a specific embodiment of the invention, the valve array is an array of pinch valves each of which configured with a pinch valve assembly that protrudes forwardly from the housing front panel.

In another specific embodiment of the invention, the pinch valve assembly comprises an abutment and an eccentrically rotating pin to define therebetween an interspace within which a tube of the tube system is restrictedly insertable and pinchable, the tube being insertable simultaneously within the interspace of a plurality of adjacent pinch valve assemblies.

According to yet another specific embodiment of the invention, the pinch valve assembly is self-lockable upon contact between a radial protruding portion and a hard-stop portion when the pin has eccentrically rotated beyond a dead center line.

In some embodiments of the invention the tube system is closed to facilitate aseptic operation of the cell isolation device in a non-sterile environment without risk of contamination.

According to an embodiment of the invention, the process container comprises a bottom strainer for straining skin pieces during a washing operation or debris during harvesting of isolated cells.

According to another embodiment of the invention, at least one of the liquid containers is an enzyme container; the cell isolation device further comprises at least one climate control chamber within which a corresponding enzyme container is retained throughout the cell isolation procedure; and each of said at least one climate control chambers comprises a Peltier unit for selective temperature control within a climate control chamber interior.

According to a specific embodiment of the invention, the shaker device further comprises a contact heater for heating the process container.

In a further aspect, the present invention provides a method for automatically performing a cell isolation procedure, comprising the steps of:

a) providing a housing in which are mounted a plurality of electrical or electronic components configured to effect a desired cell isolation procedure;

b) securely coupling a carrier, in which a tube system through which one or more isolation agents for isolating extracted tissue is flowable is encapsulated, with the housing, such that the tube system is selectively set in communication by error-free fashion with the plurality of electrical or electronic components after the carrier is coupled with the housing;

c) introducing a tissue sample into a tube of the tube system;

d) selecting a desired protocol for performing a cell isolation procedure by means of one of the electronic components; and e) performing the cell isolation procedure by sequentially operating the plurality of electrical or electronic components until the one or more isolation agents flows through the tube system and sufficiently acts on the introduced extracted tissue to isolate a cell population residing in the introduced extracted tissue to a single cell level.

According to one embodiment of the invention, the one or more isolation agents flows through the tube system which is closed to facilitate aseptic operation of the cell isolation device in a non-sterile environment without risk of contamination.

BRIEF DESCRIPTION OF THE DRAWINGS

In the drawings:

FIGS. 4A and 4B are two sections, respectively, of a schematic illustration of a cell separation and isolation process performable in conjunction with the cell isolation device of FIG. 2A;

FIG. 12 is an exploded view of a cell isolation device according to another embodiment, showing its main units prior to installation;

FIG. 13A is a front view of an operational housing used in conjunction with the cell isolation device of FIG. 12;

FIG. 13B is a side view of the operational housing of FIG. 13A when its side wall is transparent;

DETAILED DESCRIPTION OF THE INVENTION

The automatic cell isolation device, which is provided with one or more isolation agents for isolating extracted human or animal tissue to a single cell level, one or more separation agents for separating between different layers of extracted tissue if multi-layered, and a valve array through which the one or more separation agents or the one or more isolation agents are selectively flowable to the extracted tissue or to a portion or layer thereof, is housed in the same module as a biopsy kit from which a sample of the extracted tissue is received to avoid any risk of contamination and to minimize human intervention. Depending on the type of extracted tissue, different protocols can be implemented to separate one cell population out of many populations of cells residing within the extracted tissue, and isolate said cell population to single cell level. The different protocols include the use of specific separation or isolation agents as well as mechanical manipulations. A specific cell isolation protocol can be selected by means of a user interface.

As referred to herein, the terms "extracted tissue", "tissue sample" and "biopsy" are interchangeable.

First Embodiment

Figure 1:
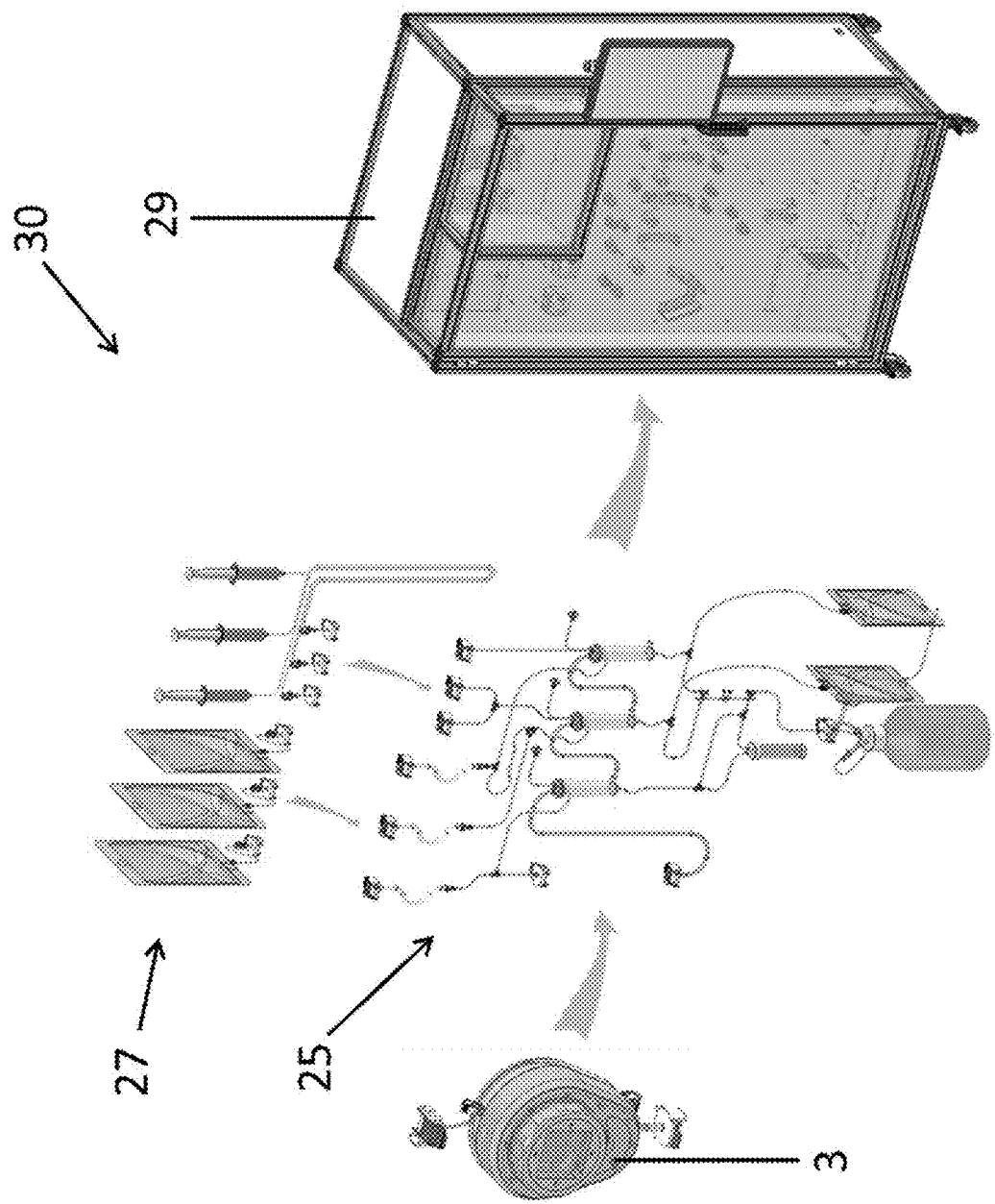
FIG. 1 is an exploded view of a cell isolation device according to one embodiment, showing its main units prior to installation.

FIG. 1 illustrates the main units of cell isolation device 30 prior to installation, according to one embodiment. Cell isolation device 30 comprises biopsy kit 3, which is described in copending WO 2020/245818 by the same Applicant and configured to transport a sample of tissue (tissue biopsy), to maintain it in a wetted condition, and to apply preliminary processing, such as cutting the sample into pieces. A main disposable unit 25, which is coupleable with biopsy kit 3, is provided with a valve array to effect a desired cell isolation protocol and with process containers. A liquid distribution unit 27 includes a plurality of separate liquid containers including media bags and syringes, e.g. six containers, which are connectable to main disposable unit 25. Each of these main components is supportable by housing 29, in which electrical and electronic components for assisting in performance of the cell isolation protocols are housed.

Figure 2A:
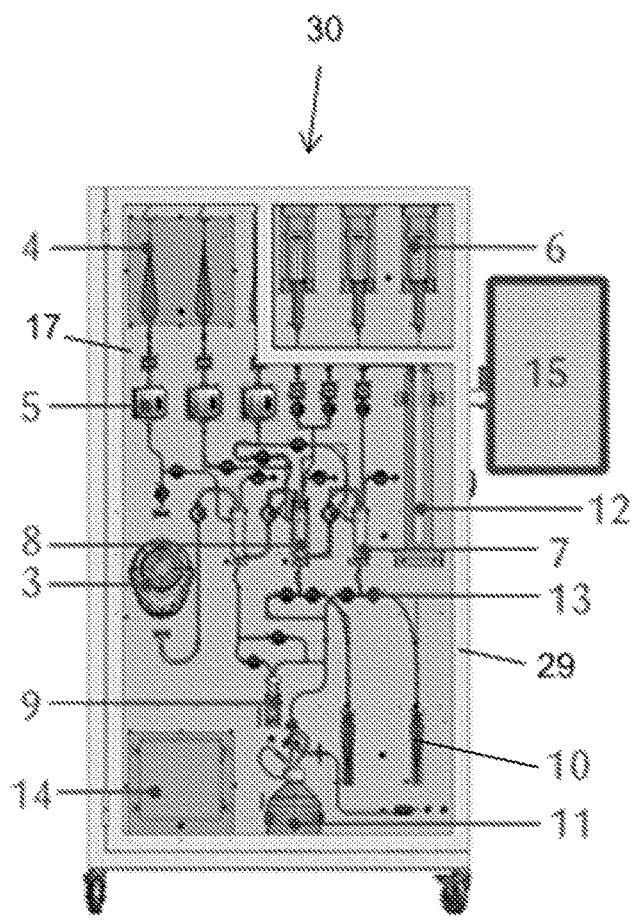
FIG. 2A is a front view of the cell isolation device of FIG. 1 following installation.
Figure 2B:
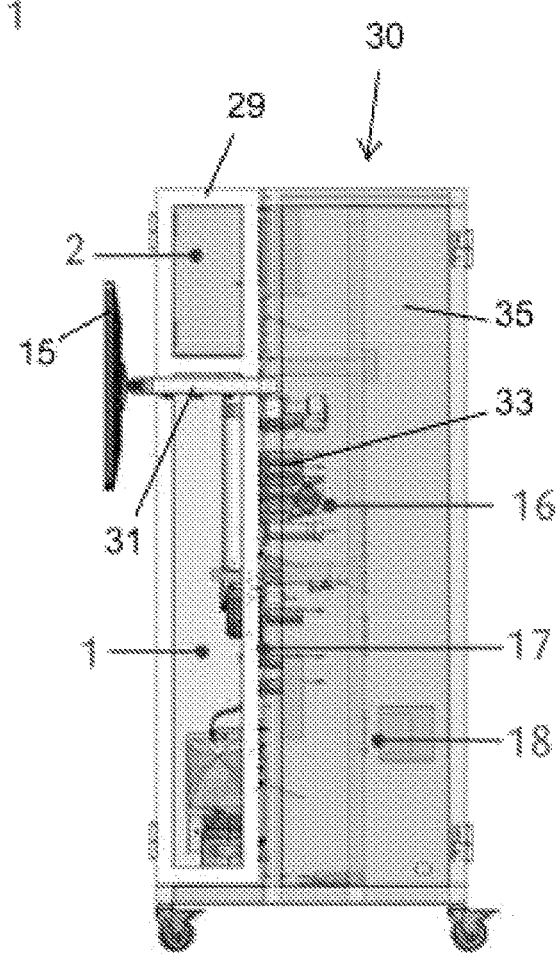
FIG. 2B is a side view of the cell isolation device of FIG. 2A.

FIGS. 2A and 2B illustrate the layout of cell isolation device 30 following installation. Housing 29 is configured with a large chamber 1, which is configured to maintain the extracted tissue sample as well as the separated tissue or isolated cells at a physiological temperature of 37° C. by means of heater 14. Various measurement probes interspersed throughout the housing are adapted to measure the current temperature within chamber 1. Housing 29 also has a small and upper chamber 2 which is able to be maintained at the ambient temperature, or at any other desired temperature, and in which a plurality of syringes 6, or, alternatively, media bags, are held. A touchscreen 15 displaying the user interface may be cantilevered from the side of housing 29 by an arm 31, which may be adjustable.

Within large chamber 1 are supported on a vertical base plate 17, from top to bottom, a plurality of media bags 4, e.g. three, a peristaltic pump 5 in liquid communication with a corresponding media bag, a plurality of process containers 7, e.g. three, biopsy kit 3, valve array 13, sample container 9, a plurality of final product bags 10, e.g. two, heater 14 and waste container 11. If desired, heater 14 may be repositioned, for example at the top of large chamber 1. A heat exchange cylinder 12 may be positioned to the right of process containers 7 to warm the liquid discharged from syringes 6 or from the media bags.

Base plate 17 separates rear chamber 35 from large chamber 1 and small chamber 2. Within rear chamber 35 is housed circuitry 33, which is provided with main switch 16 and power supply 18. Various sensors electrically connected to circuitry 33 are mounted on base plate 17 within large chamber 1.

Figure 3:
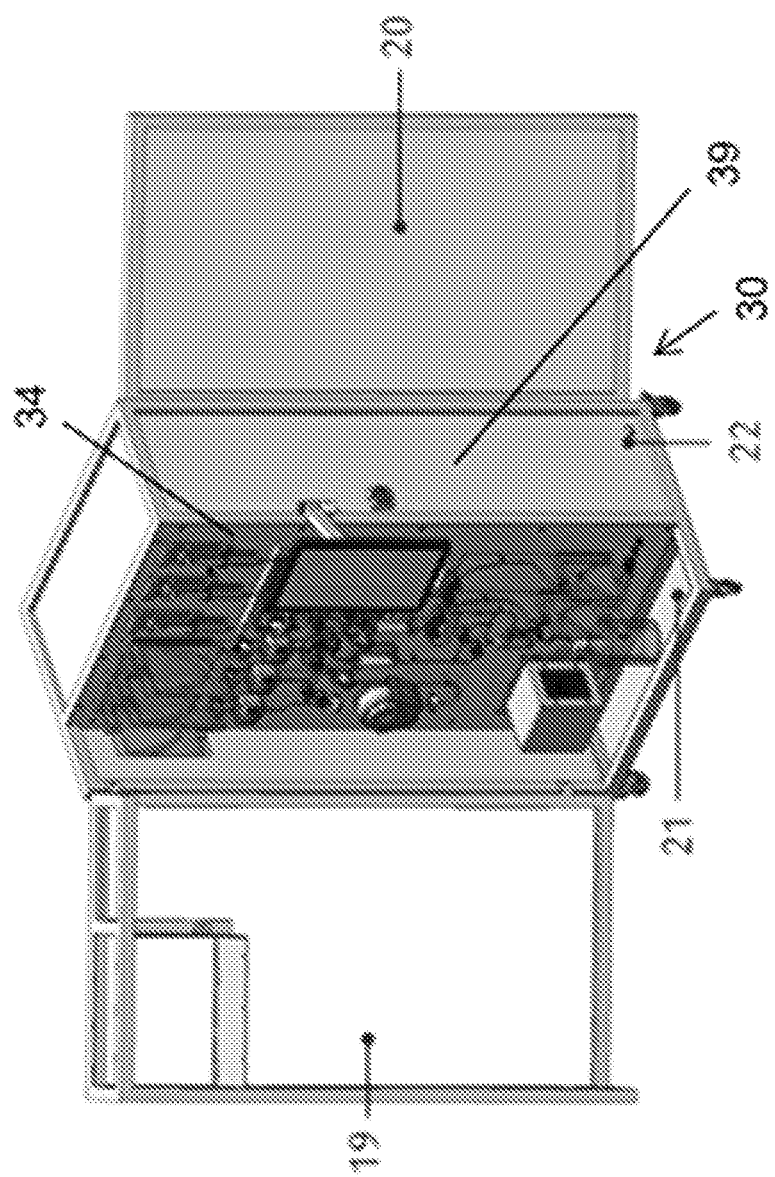
FIG. 3 is a perspective view of the cell isolation device of FIG. 2A, showing front and rear closures when opened.

FIG. 3 illustrates cell isolation device 30 when the pivotal front transparent closure 19 and the rear pivotal closure 20 which normally locks the rear circuitry-housed chamber are opened. A removable drip tray 21 may be provided at the bottom of base plate 17 to receive spillage from any of the containers or valves being supported thereby. A plug 22 connectable to the electric mains is accessible via side 39 of the housing.

Figure 4B:
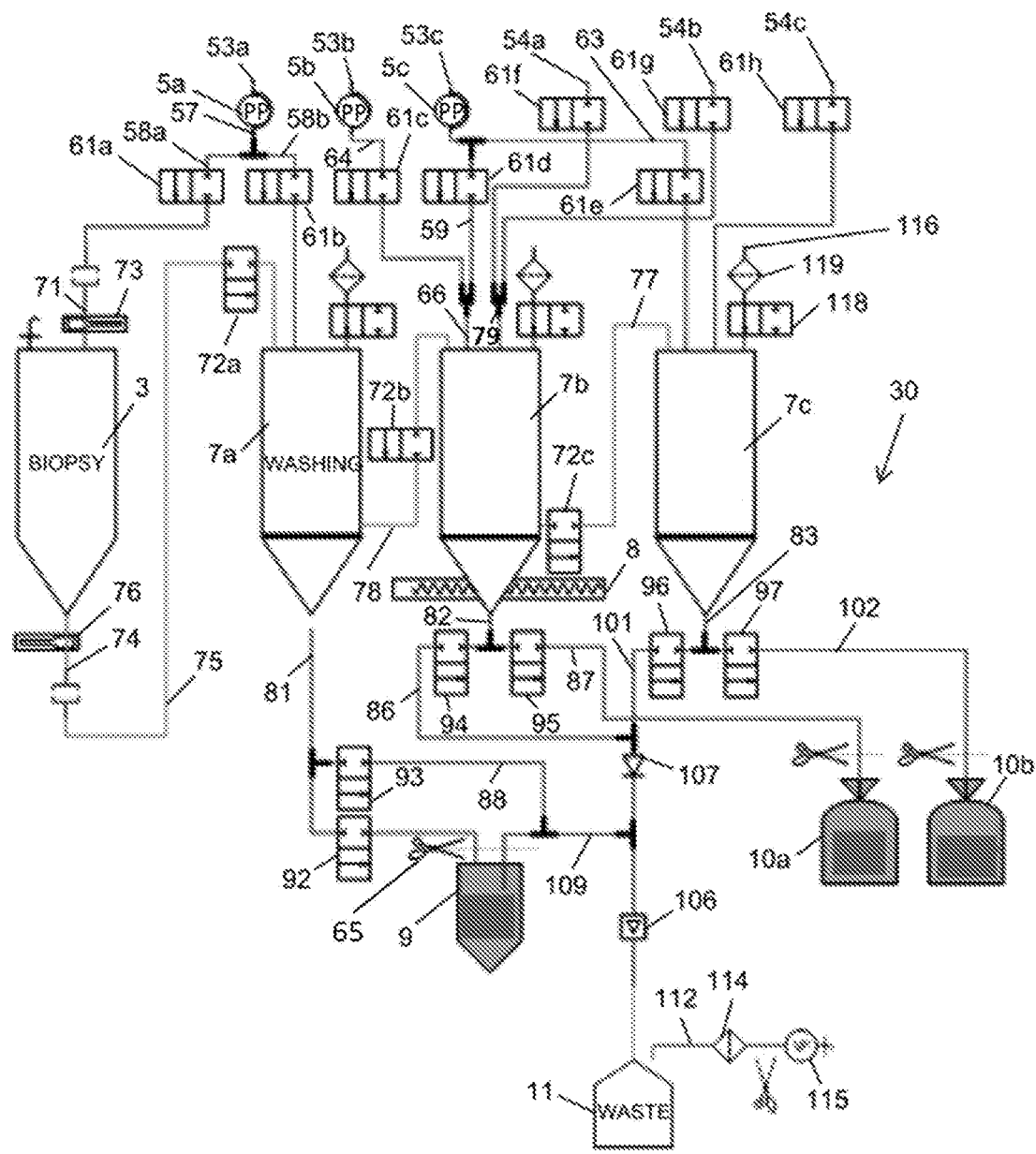

FIGS. 4A-B schematically illustrate the interconnections of the various components of cell isolation device 30 according to one embodiment.

Three different process containers 7a-c, which may have a hopper configuration, are provided to process the solid sample received in biopsy kit 3 using one or more of a plurality of solutions derived from the liquid distribution unit by a selected protocol. A bottom region of each process container may be configured with a filter, such as a 100-μm cell strainer made of a hydrophobic polypropylene or polyamide mesh to resist cell adhesion during isolation.

Regarding the liquid distribution unit, separate media bags 4a-c are prefilled with a selected solution, for example prefilled with a washing solution, phosphate buffered saline solution (PBS), and a cell culture medium containing fetal bovine serum (FBS) in order to inhibit enzyme activity after isolation, such as a medium suitable for culturing fibroblast (FBM), respectively. Tubes 44a-c, e.g. medium sized with an inner diameter of 3.2 mm, which extend from media bags 4a-c, respectively, to a corresponding sterile connector 41, are fitted with a corresponding slide clamp 48 for retaining the solution in a corresponding media bag while being filled and being mounted on the base plate. Likewise, separate syringes 6a-c or media bags are prefilled with a selected solution, for example prefilled with the enzymes dispase, trypsin and liberase™, respectively. Dispase is a neutral protease which may be used for separating many cells and tissue layers, for example between the dermis and epidermis of extracted skin tissue. Trypsin and liberase™ are enzymes that are suitable for the dissociation of tissue and the isolation of cells to a single cell level. For example, trypsin may be used as an isolating agent for isolating single keratinocytes from the epidermis layer of the skin, while liberase™ is an enzyme which is suitable for isolating fibroblasts from the dermis layer. Tubes 46a-c, e.g. small sized with an inner diameter of 1.6 mm, which extend from syringes 6a-c, respectively, to a corresponding sterile connector 47, are fitted with a corresponding slide clamp 48 for retaining the solution in a corresponding media bag while being filled and being mounted on the base plate.

Tubes 53a-c extend through peristaltic pumps 5a-c, respectively, which provide good chemical compatibility and dosing capabilities, to a corresponding sterile connector 56, adapted to be connected with the corresponding sterile connector 41.

The sterile connector 67 of each of tubes 54a-c is adapted for connection with a corresponding sterile connector 47. Tubes 54a-c pass through pinch valves 61f-h, respectively.

Tubes 53a-c and 54a-c may be in heat exchanger relation with heated volume 36, such as a bath, for example by means of cylinder 12 (FIG. 2A), so that the discharged solution will be heated to a physiological temperature to obtain optimal enzyme activity.

Peristaltic pump 5a is in liquid communication with pinch valves 61a and 61b by tubes 58a and 58b, respectively, branching from tube 57. Tube 58b extends to process container 7a. Peristaltic pump 5b is in liquid communication with pinch valve 61c by tube 64, which additionally extends to process container 7b after joining common tube 66 connected to tube 59. Tube 59 in turn is in liquid communication with pinch valve 61d and branches from angled tube 63, which exits peristaltic pump 5c and extends to process container 7c after passing through pinch valve 61e. Tube 54c also extends to process container 7c after passing through pinch valve 61h. A pinch valve provides fast and liquid-tight shutoff capabilities while being configured without any seals.

Another common tube 79 extends to process container 7b. Common tube 79 is connected to tubes 54a and 54b.

In one embodiment, one or more of tubes 58a, 58b and 66 are connected to an upper portion of the tubular wall of process containers 7a and 7b, respectively, in such a way that that the liquid discharged from a corresponding tube flows tangentially with respect to the upper portion of the tubular wall and develops a rotary flow. Under the influence of gravity, the discharged liquid is urged downwardly; however, the tangential component of the rotary flow forces the gravitating liquid to spiral down the inner face of the tubular wall. The spiraling flow of the discharged liquid along the inner face of the tubular wall advantageously applies a loosening force to any adhering skin piece or connective tissue piece to ensure that the adhering piece can be washed down.

Biopsy kit 3 is equipped with upper tube 71 having an upper clamp 73 and with lower tube 74 having a lower clamp 76. Upper tube 71 is connectable with tube 58a by a sterile connector couple 41-56 or 47-67, and lower tube 74, which may be relatively large-sized as well as the flushing tubes with an inner diameter of 6.35 mm, is connectable by a sterile connector 41 with flushing tube 75 which passes through pinch valve 72a and extends to process container 7a.

It will be appreciated that adjacent tubes may be welded together by a sterile or aseptic connection instead of using each of the sterile connectors 41.

Flushing tube 75 is angled upwardly towards pinch valve 72a and then downwardly towards process container 7a, in order to introduce the effluent from biopsy kit 3 into process container 7a from above. Flushing tube 78 extends outwardly from an intermediate region of process container 7a in a direction that is substantially perpendicular with respect to its central vertical axis, and is angled upwardly towards pinch valve 72b through which it passes and then downwardly towards process container 7b. Flushing tube 77 extends outwardly from an intermediate region of process container 7b in a direction that is substantially perpendicular with respect to its central vertical axis, and is angled upwardly towards pinch valve 72c through which it passes and then downwardly towards process container 7c.

The effluent from process container 7a is suctioned by means of vacuum pump 115 through its small-diameter bottom opening to discharge tube 81 that leads to sample container 9, which is configured with sterile sealing and separation means 65, after passing through pinch valve 92. The effluent from process container 7b is suctioned through its small-diameter bottom opening to discharge tube 82 that branches to tubes 86 and 87 passing through pinch valves 94 and 95, respectively. Tube 87 extends to final product bag 10a, which is configured with sterile sealing and separation means 65. The effluent from process container 7c is suctioned through its small-diameter bottom opening to discharge tube 83 that branches to tubes 101 and 102 passing through pinch valves 96 and 97, respectively. Tube 102 extends to final product bag 10b, which is configured with means 65.

Tube 101 equipped with liquid detection sensor 106 extends to waste container 11, which is configured with means 65. A check valve 107 may be operatively connected to tube 101 upwardly from sensor 106. Tube 86 extends to tube 101 at a junction located upwardly from check valve 107. A tube 109 may branch from tube 101 downwardly from sensor 106 and extend to sample container 9. A tube 88 branching from tube 81 and passing through pinch valve 93 may extend to tube 109.

A shaker device 8 is positioned rearwardly to, and kinematically connected with, process container 7b. A shaker device may also be kinematically connected with one or both of process containers 7a and 7c. Shaker device 8 may be operated to produce a gentle shaking action that prevents excessive adherence of the tissue pieces to a process container wall or that causes selective release of the desired tissue layer or cell population from the tissue piece. Alternatively, shaker device 8 may be operated to produce a vigorous shaking action, generally causing the liquids contained within the process container to undergo precession-induced turbulent flow, in order to introduce air bubbles and to facilitate the release of tissue layers or single cells from the tissue. Shaker device 8 may also produce a rotation that introduces a vortex to the process containers. For example, with respect to process container 7c, vigorous shaking at the end of an incubation stage, during which separated dermis pieces are immersed in liberase™ for a certain period of time and are heated to a physiological temperature, facilitates the release of fibroblasts from the separated dermis layer of the skin pieces.

A vacuum pump 115 equipped with a sterile filter 114 may be operatively connected to waste container 11 by conduit 112, in order to selectively draw material from one or more of the process containers. In order to ensure that a process container is airtight, each of the process containers is configured with a vent 116 that is sealable with a corresponding pinch valve 118. A sterile filter 119 may also be provided.

An actuator of each of the electromechanical devices associated with cell isolation device 30 is housed within the rear chamber of the housing and in electrical communication with a controller for initiating a desired cell isolation procedure. For example, the actuator for each pinch valve may be a solenoid actuator that is operable to engage an electromechanical magnet that causes compression bars either to be pushed together to keep an elastomeric sleeve through which a fluid flows in a collapsed and sealed position or to be separated so that the sleeve will be set to an opened position.

Figure 5:
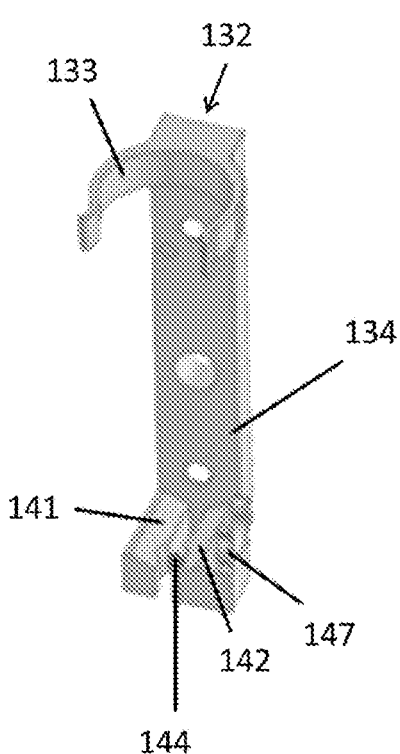
FIG. 5 is a perspective view of a holder for a process container used in conjunction with the cell isolation device of FIG. 2A.
Figure 6:
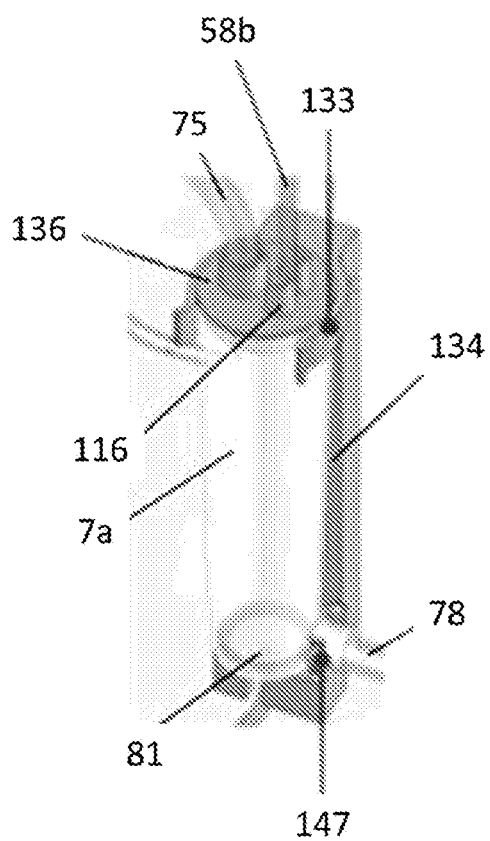
FIG. 6 is a perspective view of the holder of FIG. 5, when engaged with the process container.

FIGS. 5 and 6 illustrate a holder 132 for process container 7a. Holder 132 is configured with a mounting plate 134, e.g. rectangular, which is mountable on base plate 17. A semicircular clamp 133 at the top of plate 134 is used to engage an upper peripheral region of process container 7a as well as lid 136 which is configured with three fittings for tube 58b, tube 75 and vent 116, respectively. Two oppositely inclined and separated support elements 141 and 142 for supporting the corresponding bottom inclined configuration of process container 7a are provided at the bottom of plate 134. An arcuate recess 144 is formed in each of support elements 141 and 142 to accommodate the passage therethrough of bottom tube 81. Another semicircular clamp 147 protruding upwardly from support element 142 is used to engage a fitting for side tube 78.

Similar holders are provided for the other containers to allow the container to be releasably engaged by a clamp, while the clamp may be snapped in place within a mounting plate.

Figure 7:
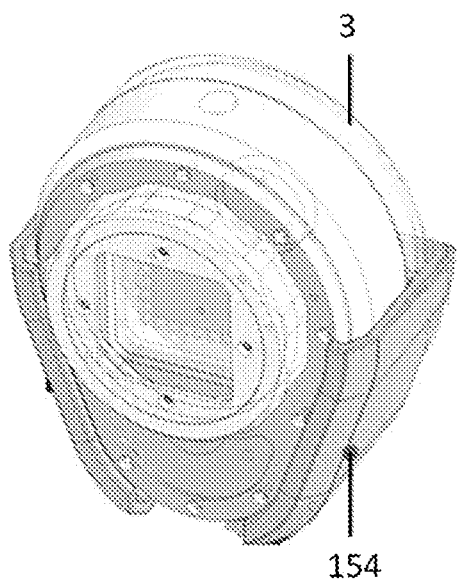
FIG. 7 is a perspective view of a holder for a biopsy kit used in conjunction with the cell isolation device of FIG. 2A.

FIG. 7 illustrates a holder 154 for biopsy kit 3.

Figure 8:
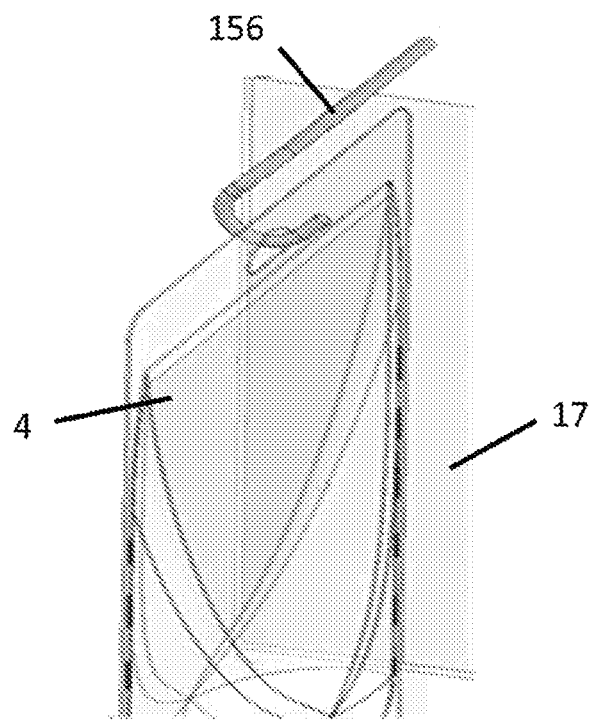
FIG. 8 is a perspective view of a holder for a media bag used in conjunction with the cell isolation device of FIG. 2A.

FIG. 8 illustrates a holder 156 for a media bag 4 that is configured as a bent stainless-steel rod attached to base plate 17.

Figure 9:
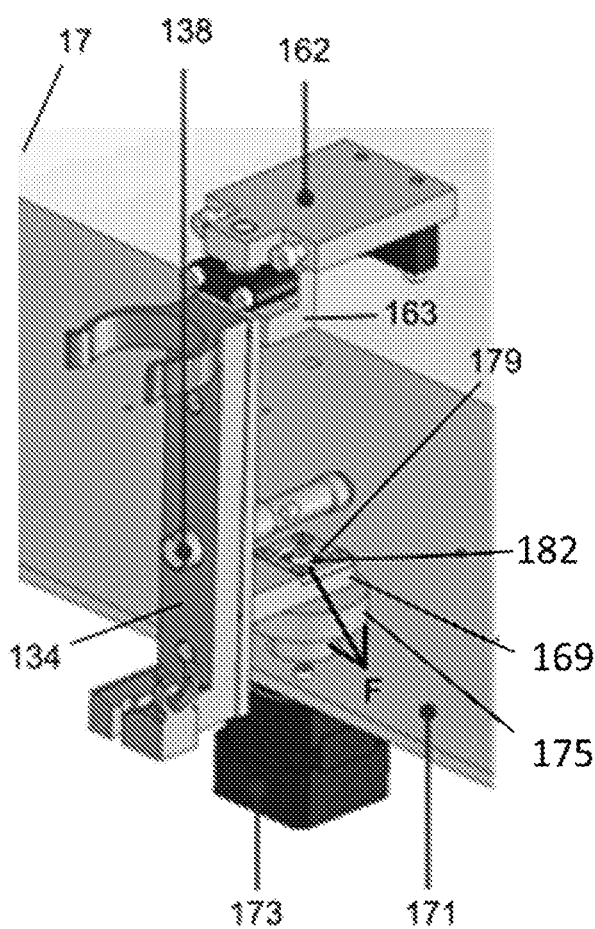
FIG. 9 is a perspective view of a shaker device used in conjunction with the cell isolation device of FIG. 2A.
Figure 10:
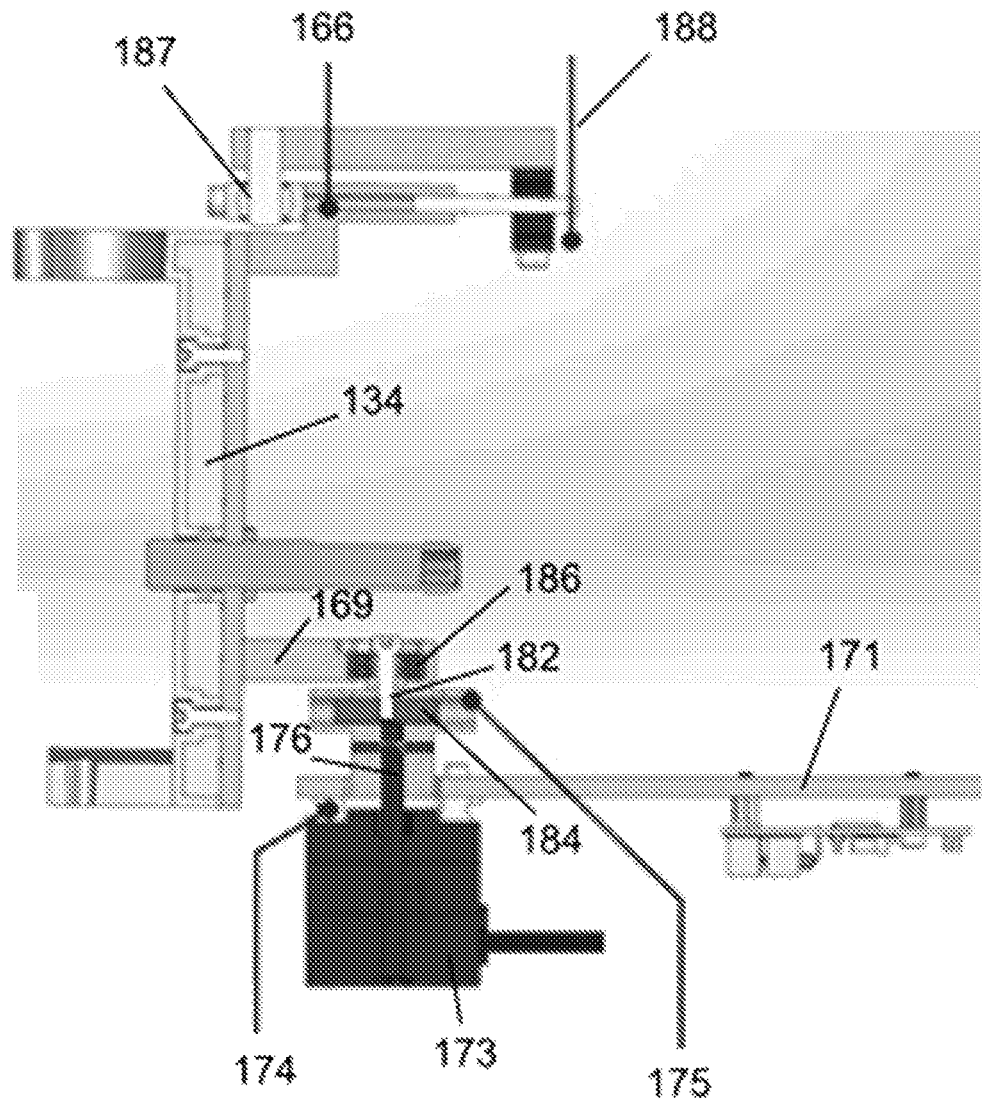
FIG. 10 is a side view of the shaker device of FIG. 9.

FIGS. 9 and 10 illustrate shaker device 8 for rotatably displacing the mounting plate 134 of process container 7b by cyclical rotary motion, which may be precessional, similar to a wobbling effect, to generate precession-induced turbulent flow or a vortex for the liquid contained within process container 7b if its speed if sufficiently high, or alternatively by intermittent movement, which may be in alternating directions, and to thereby shake the liquid content of process container 7b. Mounting plate 134 of process container 7b is configured with clamps and inclined support elements as shown in FIG. 5.

An angled mounting arm 163 is connected to the upper region of the inner face of plate 134, and is hung onto substantially horizontal rod 166 about which the mounting arm is able to swivel. Rod 166 is fixed by mounting assembly 162 protruding outwardly from vertical base plate 17 so that rod 166 will be substantially perpendicular to base plate 17. Rod 166 constitutes the axis of rotation of mounting plate 134, and extends at its forward end from a ball joint 187 or other resilient means housed within mounting assembly 162 to a vertical rail 188 at its rearward end with which the rod is slidably attached. Vertical rail 188 may be attached to support elements located within the rear chamber of the housing. Through the interaction of ball joint 187 which is adapted to be slightly vertically displaced in response to the rotary displacement of mounting plate 134, rod 166 will likewise be slightly vertically displaced along vertical rail 188. Rod 166 also prevents mounting plate 134 from rotating about a vertical axis.

A capacitive sensor 138 for determining the liquid level within process container 7b is shown to be secured to mounting plate 134. Sensor 138 and the wall of process container 7b form a capacitor whose capacitance is dependent on the liquid level within process container 7b. Discharge of liquid within process container 7b is permitted when the capacitance and therefore the liquid level is greater than a predetermined value. However, when sensor 138 determines that the capacitance and therefore the liquid level drops below the predetermined value, sensor 138 transmits a signal to processor 192 (FIG. 11) to initiate termination of suction-induced delivery of the liquid from process container 7b. Any other suitable liquid level sensor may be used in lieu of the capacitive sensor.

Shaker device 8 comprises a motor 173, e.g. a DC brushless motor, for causing the angular displacement of mounting plate 134. Motor 173 is affixed to substantially horizontal base plate 171, which is attached to the housing. Vibrations of motor 173 may be reduced by installing damper 174, which may be a rubber spacer. The substantially vertical output shaft 176 of motor 173 protrudes upwardly from base plate 171 and drives a flywheel 175. A pin 182 extending upwardly from flywheel 175 projects into an aperture 179 formed in planar appendage 169, which protrudes rearwardly from, and is connected to, an intermediate region of mounting plate 134. Pin 182 is adjustably fixed to flywheel 177 by means of nut 184.

While flywheel 175 rotates, pin 182 rotates eccentrically with respect to the longitudinal axis of aperture 179, the degree of eccentricity being adjustable by means of nut 184. As a result of the eccentric rotation of pin 182, the latter periodically forcibly contacts the wall of aperture 179 to apply a driving force F to appendage 169 in a direction from output shaft 176 to the point of contact. Driving force F is transmitted to mounting plate 134, causing the latter to rotate in a similar direction about rod 166. Pin 182 is rotatably supported within aperture 179 by self-aligning ball bearing 186.

After driving force F is transmitted to mounting plate 134, the angular displacement of mounting plate 134 may be as much as 10 degrees or more. The center of gravity of mounting plate 134 and of the process chamber held thereby is consequently raised, causing a vertical force to be applied to both rod 166 and to appendage 169. Following the cyclical upward and downward angular displacement of mounting plate 134, ball joint 87 oscillates. Consequently, the orientation of the axis of rotation passing through rod 166 varies, and mounting plate 134 precesses about its rotation axis. Appendage 169 also undergoes precessional motion through the interaction of self-aligning ball bearing 186. The generation of precessional motion for mounting plate 134 facilitates performance of a vigorous shaking action to generate precession-induced turbulent flow for the liquid contained within the process container that is instrumental in one or more steps of a cell isolation protocol.

As can be appreciated from the description, the cell isolation device supports a large number of possible flow paths for a solution from the liquid distribution unit to a process container, sample container, and a plurality of final product bags by virtue of a configurable array of pinch valves. The actual flow paths and operation of components along the flow paths (hereinafter "sequence") are user selected depending on the type of tissue sample that has been extracted, the type of cell that is desired to be isolated, the type of implantation that is desired to be performed, or on any other factors.

Figure 11:
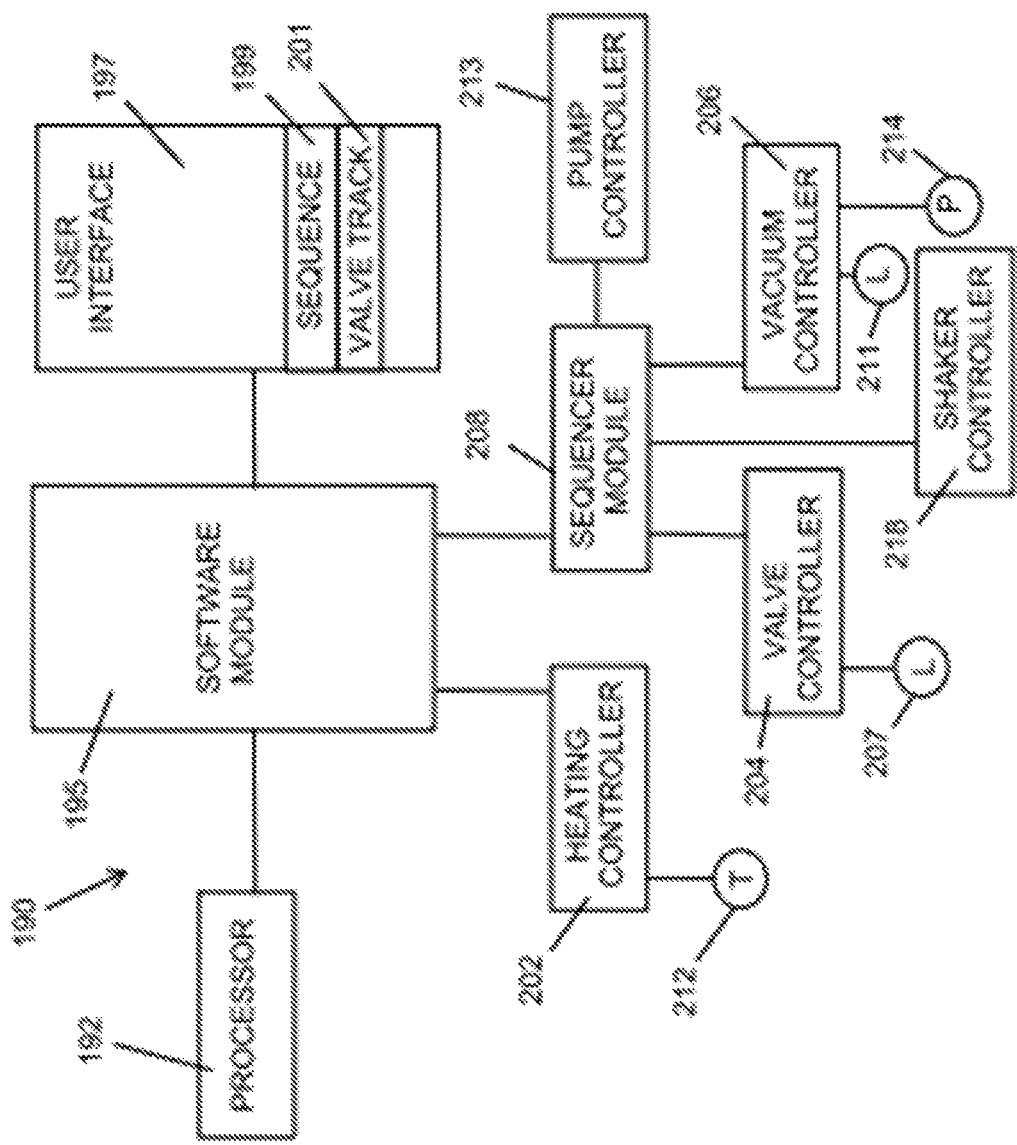
FIG. 11 is a schematic illustration of a control system that is operable in conjunction with the cell isolation device of FIG. 2A.
Figure 13C:
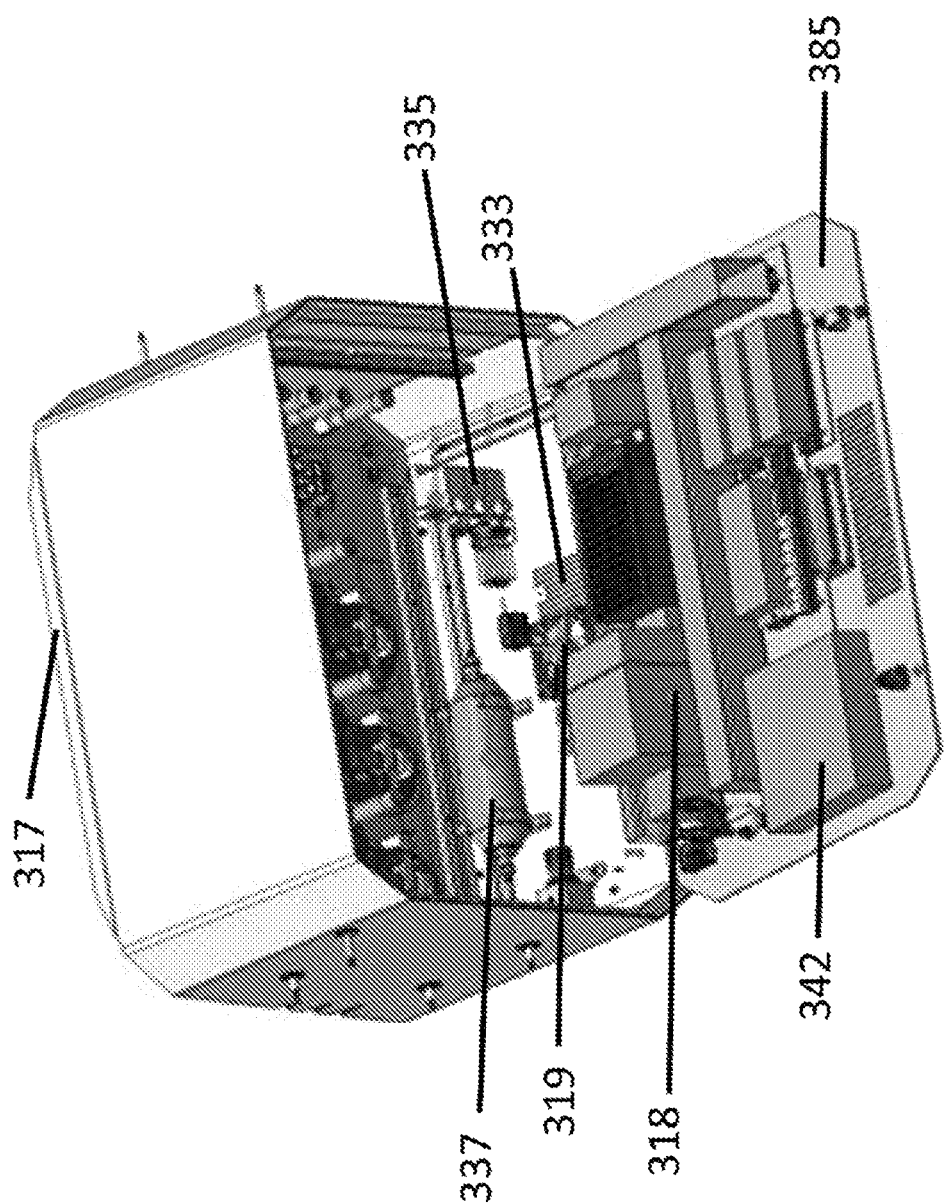
FIG. 13C is a perspective view of the housing of FIG. 13A from above and from the rear when its rear panel is opened.
Figure 13D:
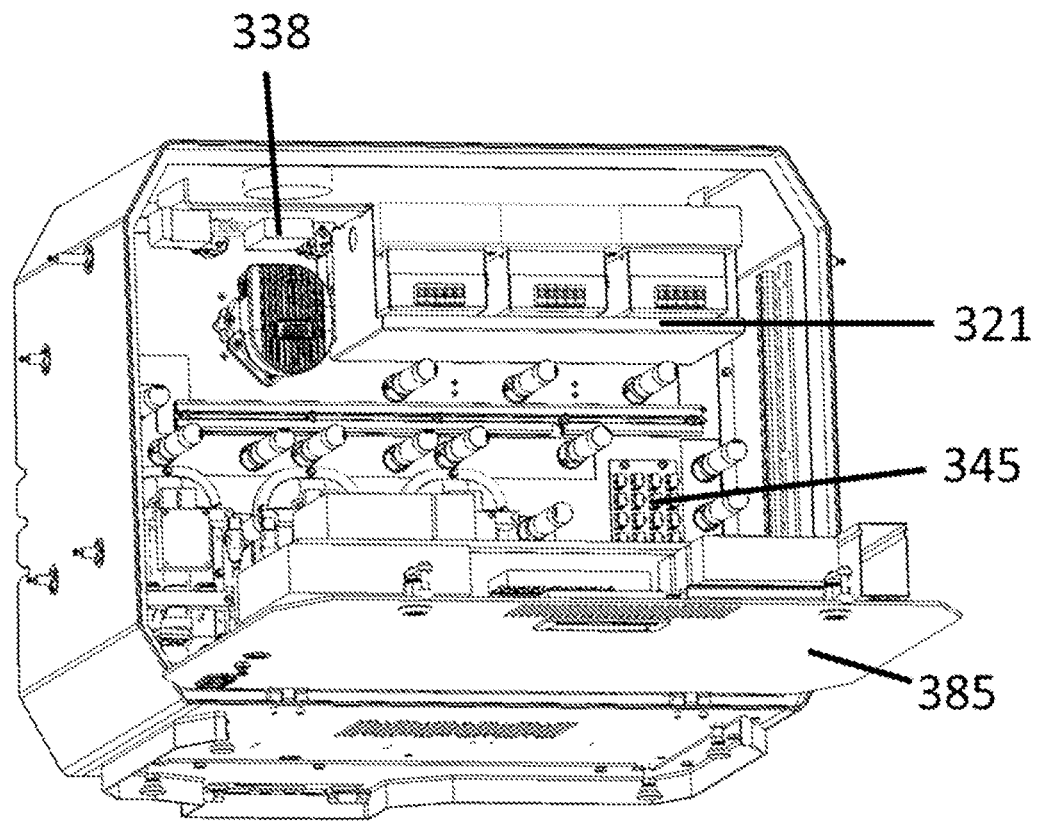
FIG. 13D is a perspective view of the housing of FIG. 13A from the rear when its rear panel is opened.

FIG. 11 schematically illustrates an embodiment of a control system 190 that is operable in conjunction with cell isolation device 30.

Control system 190 comprises processor 192 on which is executable automation control software module 195. Software module 195 causes user interface 197 to be displayed, and transmits commands to the various modules of the control system, depending on user selection. A list of various user-selectable sequences 199 is viewable on user interface 197. A sequence is caused to run after being selected and submitted by the user.

Through manipulation of user interface 197, each step of a sequence is viewable. If no sequence is currently running, a Valve Track screen 201 is accessible through user interface 197. A Valve Track is an identifiable configuration which defines the open-close status of each pinch valve of the valve array for a specified step of one of the sequences. A Valve Track may be reconfigured by the user, and will be stored in memory if software module 195 determines that it is logically compatible with other steps of the sequence.

Control system 190 also comprises heating controller 202, which controls operation of the heater in response to temperature readings provided by one or more temperature sensors 212 located within the large chamber, valve controller 204 which causes actuation of each pinch valve during a step of the selected sequence in accordance with the corresponding defined Valve Track or in response to reading provided by a liquid level sensor 207, vacuum controller 206 for controlling operation of the vacuum pump in conjunction with readings from a liquid level sensor 211 or a pressure sensor 214, or in response to a previous entered step of a sequence, and sequencer module 208 interfacing with software module 195 and with valve controller 204, vacuum controller 206, pump controller 213 for commanding operation of the peristaltic pumps and syringe pumps, and shaker controller 218, in order to execute each step of the selected sequence until completion of the sequence. Heating controller 202 may operate independently of sequencer module 208.

The steps of a typical cell isolation procedure will now be described with respect to a skin sample (biopsy) received and cut by the biopsy kit, with reference to FIGS. 4A-B. A skin sample, e.g. a split-thickness skin biopsy, is a multi-layered biological structure that consists of an outermost epidermis layer mainly comprising keratinocytes and an inner dermis layer comprising collagen, fibroblasts and other cell types. In order to obtain two different cultures of isolated keratinocytes and isolated fibroblasts, separation between the two skin layers must take place at the basement membrane. This step of separating the dermis from the epidermis is crucial to the success of the following steps in the process of skin formation. Specifically, the presence of residual fibroblasts in the keratinocytes culture should be avoided.

Although the following procedure is described with respect to isolating cells of a skin sample, it will be appreciated that the invention is also suitable to isolating cells of any other connective, epithelial or other tissue sample.

The following are the steps of a typical cell isolation procedure for a skin sample:

(1) Receiving and cutting skin sample in biopsy kit 3;
(2) Opening valves 72a and 92 while all other valves are closed, opening clamp 76, and then operating vacuum pump 115 so that the skin sample will be flushed from biopsy kit 3 to washing container 7a;
(3) While vacuum pump 115 remains in operation, the liquid in biopsy kit 3 will be flushed into sample container 9 and any overflow will be directed to waste container 11;
(4) Vacuum pump 115 is deactivated and valves 72a and 92 are closed and clamp 76 remains open;
(5) Valve 61a is opened and peristaltic pump 5a is activated so that biopsy kit 3 will be filled with washing solution;
(6) Valve 61a is closed and peristaltic pump 5a is deactivated;
(7) Step 2 is repeated to ensure that any remaining skin tissue will be flushed from biopsy kit 3 to washing container 7a; however, valve 93 is opened instead of valve 92, in order to bypass sample container 9, which is already filled at this point;
(8) Vacuum pump 115 is deactivated and valves 72a and 93 are closed;
(9) Valve 61b is opened and peristaltic pump 5a is activated so that the skin sample will be incubated with the washing solution;
(10) Valve 61b is closed and peristaltic pump 5a is deactivated;
(11) Valve 93 is opened, and the used washing solution is directed from washing container 7a to waste container 11;
(12) Steps 9-11 are repeated a number of times, e.g. 8 times;
(13) Closing valve 93 and opening valves 72b and 94, and then operating vacuum pump 115 so that the skin sample will be flushed from washing container 7a to separation container 7b and the washing solution will be discharged to waste container 11;
(14) Vacuum pump 115 is deactivated and valves 72b and 94 are closed;
(15) Valve 61f is opened to add dispase for 90 min to separation container 7b;
(16) During the 90 min period, shaker device 8 is periodically operated for an interval of 10 s every 15 minutes;
(17) Following the 90 min period, valve 61f is closed and then valve 61c is opened, and peristaltic pump 5b is operated to additionally add PBS to separation container 7b to facilitate a more pronounced separation operation of dermis and epidermis pieces while shaker device 8 is operated by slower cycles or by patterns that induce turbulent flow and thus introduce air bubble into the fluid to help the keratinocytes staying afloat on the liquid surface;
(18) Peristaltic pump 5b and shaker device 8 are deactivated and valve 61c is closed;
(19) Valves 72c and 96 are opened and vacuum pump 115 is operated to cause discharge of the dermis pieces from separation container 7b to fibroblast isolation container 7c, until liquid level sensor 138 (FIG. 9) associated with separation container 7b detects a low liquid level condition to cause the closing of valve 72c, to ensure that epidermis pieces, which are afloat on the surface of the liquid in container 7b, remain in the remaining liquid;
(20) Valve 96 is closed and valve 61h is opened to ensure that the dermis pieces in container 7c will be immersed in liberase™, for example for 16 h or more;
(21) Valve 94 is opened so that separation container 7b will be completely emptied of PBS and dispase solutions through suction-induced delivery to waste container 11;
(22) Valve 94 is closed, valve 61c is opened, and peristaltic pump 5b is operated so that additional PBS will be added to separation container 7b to deliver all epidermis pieces to the filter of separation container 7b, while shaker 8 is being operated so that the adhesive epidermis pieces will be caused to detach from the walls of separation container 7b;
(23) Valve 61c is closed, and peristaltic pump 5b is deactivated;
(24) Step 21 is repeated, so that separation container 7b will be once again completely emptied and the trypsin to be introduced in step 35 will not be diluted by the additional PBS which was used to flush down the epidermis pieces;
(25) Valve 61g is opened so that the epidermis pieces will be immersed in trypsin, e.g. for 2 min or more, and is then closed;
(26) Shaker device 8 is vigorously shaken to facilitate isolation of keratinocytes;
(27) Valve 61d is opened, and peristaltic pump 5c is operated to ensure that the trypsin will be sufficiently inhibited with FBM containing FBS;
(28) Valve 95 is opened so that the keratinocytes will be flushed with the FBM-inhibited trypsin solution into final product bag 10a for further processing;
(29) Steps 27 and 28 are repeated, to ensure complete drainage of the keratinocytes to final product bag 10a;
(30) Peristaltic pump 5c is deactivated and valve 61d is closed;
(31) Following sufficient immersion of the dermis pieces in liberase™ described in step 20, valve 61e is opened and peristaltic pump 5c is operated so that the liberase™ will be inhibited with FBM containing FBS;
(32) Valve 97 is opened so that the fibroblasts will be flushed with the FBM-inhibited liberase™ solution into final product bag 10b for further processing; and
(33) Peristaltic pump 5c is deactivated and valves 61e and 97 are closed.

It will be appreciated that steps 21-30 performed in relation with container 7b may be performed simultaneously with step 20, which is performed in relation with container 7c, such that the isolation of keratinocytes from the epidermis layer can occur while the dermis layer is being incubated with liberase™.

Second Embodiment

FIG. 12 illustrates the main units of cell isolation device 330 prior to installation, according to another embodiment.

Cell isolation device 330 comprises operational housing 329, in which electrical and electronic components, including an array of pinch valves and pumps, for cooperating in performance of the cell isolation protocols are housed. A biopsy kit 303, which is configured to transport a sample of tissue (tissue biopsy) and to maintain it in a wetted condition, is provided. Biopsy kit 303 may be the apparatus described in copending WO 2020/245818 by the same Applicant, or alternatively may be a different apparatus, such as the biopsy kit 3 illustrated in FIG. 7. A disposable carrier 325 is provided with a plurality of error-free mounting connections to each of the valves and pumps of housing 329, to effect a desired cell isolation protocol, and with process containers. The main disposable is encapsulated in a blister-like carrier configured with two deep-drawn thermoformed blister panels 325A-B (FIG. 14A) which are snapped together to enclose the tube set, to facilitate speedy releasable coupling of disposable carrier 325 with housing 329. A fluid distribution unit 327 includes a plurality of separate prefilled liquid containers including media and enzyme bags, e.g. six containers, and a plurality of tubes through which liquid from at least one of the liquid containers flows. The plurality of tubes, which may also be referred to as a "tube system", is sandwiched between each of the plastic foils of carrier 325 to form a pre-assembled and sterilized carrier that is disposable. Disposable carrier 325 is configured to be first connected to housing 329, followed by the liquid containers and then biopsy kit 303. Following connection of the disposable carrier, liquid containers and biopsy kit to housing 329, the various flow paths are established and completely sealed, allowing the selected cell isolation protocol to be subsequently automatically processed. While carrier 325 is disposable and adapted for one-time use, housing 329 is able to be reused for additional cell isolation procedures after being sanitized.

In this embodiment, the process area is not collectively heated, but rather the process containers are individually heated by contact heating and the temperature of the process containers is monitored. To ensure adequate enzyme activity, the enzymes are stored in a refrigerated climate control chamber and then heated to a physiological temperature of 37° C. immediately before use. Additionally, tissue samples and liquids are pneumatically conveyed.

FIGS. 13A-D illustrate an exemplary configuration of operational housing 329. A plurality of hangers 302, e.g. nine, protrude from a side wall 339 of housing 329, on each of which a corresponding liquid container is able to be held. Each hanger 302 may be configured with a protruding rod having a recess or a discontinuity on which the liquid container such as a bag is able to be hung, and with a label to indicate the type of liquid contained within the bag being hung. A touchscreen 315 displaying the user interface may be connected to a lower protruding support surface of housing 329, or to any other suitable support surface, by an arm 331, which may be adjustable. On the housing-facing surface of touchscreen 315 may be mounted a camera, lights for the camera, and an environmental temperature sensor.

Mounted on a substantially vertical front panel 317 of operational housing 329, from top to bottom, are the following fixed components that interface with the disposable carrier: (a) a status light 351, (b) one or more climate control chambers 301, e.g. three, (c) pressure monitoring connectors 352, e.g. three, (d) a peristaltic pump 305 in liquid communication with the media or enzyme bags for delivering a desired dose of liquids to each of the process containers, (e) sterile connector holders 355, (f) a plurality of interspersed pinch valve assemblies 361, e.g. 20, (g) a plurality of distributed securing units 363 for securely holding the disposable carrier, e.g. eight, (h) a plurality of shaker-holder modules 308, e.g. three, each of which mounted in a corresponding cavity and adapted to interact with a corresponding process container, (i) contact heaters 314, e.g. two, (j) a bubble detection sensor 368 for detecting the presence of bubbles in a flowing liquid, (k) biopsy container holder 369, (l) venting connector 379, and (m) valve safety switch 384.

The following components may be mounted in a chamber between front panel 317 and rear pivotally openable panel 385: (i) USB connectors 312, e.g. two, (ii) main switch 316 which may also be equipped with a plug connectable to the electric mains, (iii) power supply and controller module 318, (iv) removable drip tray 321 to receive spillage or condensate from any of the climate control chambers, (v) cooling fan 322, (vi) ventilation outlet 333, (vii) gas handling valves 335, (viii) gas tank 337, (ix) audio amplifier 338, (x) processor 342, and (xi) valve connector board 345.

Processor 342 is in electrical communication with all electrical and electronic components of the cell isolation device, including particularly the electromechanical components. A dedicated software application running on processor 342 synchronizes the operation of all the components in accordance with a selected protocol. The user interface outputs content of importance to touchscreen 315 with which the user is able to interface.

The software application has two modes. The first mode is the Cell Isolation Run mode whereby the user is guided through the necessary steps to perform the cell isolation procedure. The second mode is the Service mode for the purpose of servicing and monitoring the cell isolation device. During the Service mode, all internal states, such as the states of the temperature or membrane pump controllers, and sensor inputs, such as those of the temperature and pressure sensors, can be viewed on the touchscreen. Additionally, each component can be individually controlled to facilitate manual operation of the cell isolation device. The user may also identify electrical or software errors during the Service mode.

Figure 29:
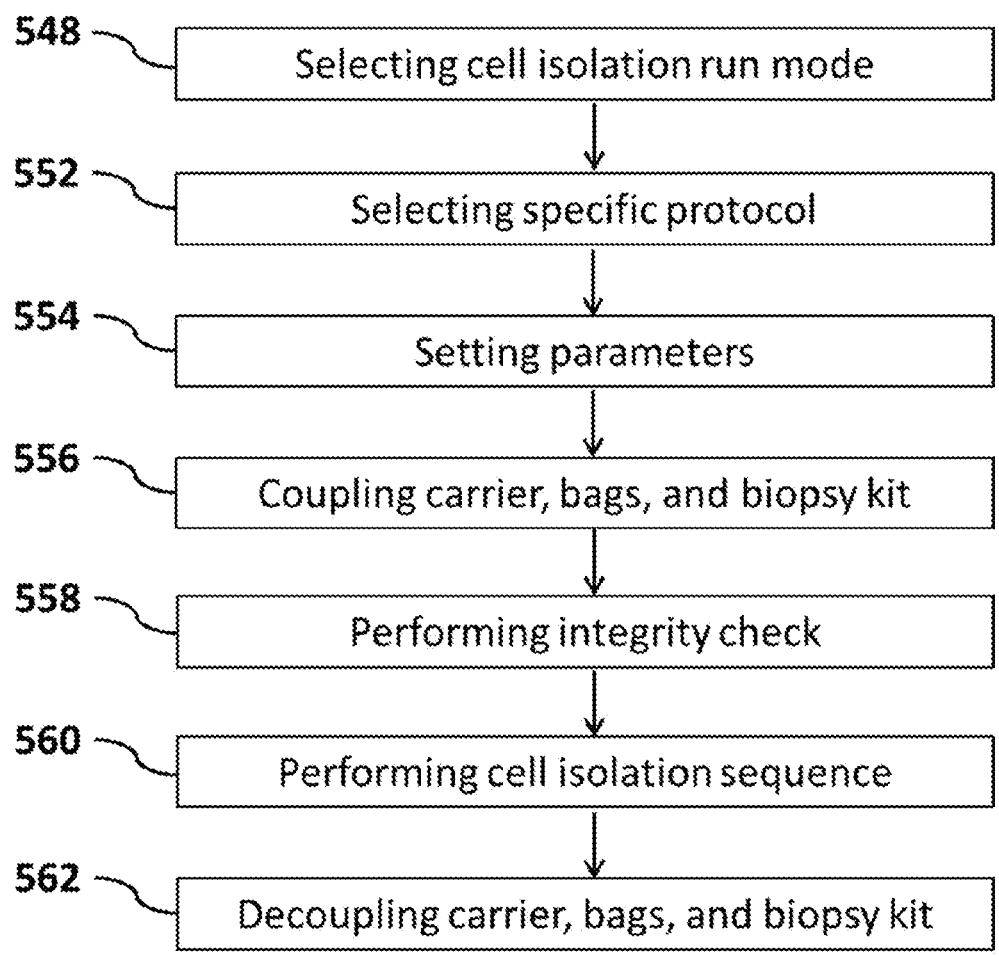
FIG. 29 is a user guided method for performing a cell isolation procedure.

FIG. 29 illustrates various operations that are performed during the Cell Isolation Run mode.

After a displayed Start Cell Isolation Run button of the user interface is selected in step 548, the user is guided through each step which is needed to complete the run. The user must successfully complete each step by pressing the Next button; the cell isolation procedure will not be performed if the user skips a step.

The user is guided through at least the following steps:
1. Selecting a specific cell isolation protocol in step 552;
2. Setting the parameters of a cell isolation run in step 554, including the number of repetitions, durations, liquid quantities and shake speeds;
3. Securely coupling a new main disposable carrier, fresh liquid containers, and a loaded biopsy kit to the housing front panel in step 556, while a tactile recognition switch may be used to detect whether the carrier has been sufficiently passed over the lock handles;
4. Performing an integrity check with respect to the coupled carrier in step 558 by operating the peristaltic pump, selectively opening and closing valves, measuring a tube system pressure such as with the pressure sensor connected to a common tube with a quick connector, and determining whether the carrier has any air leaks if a pressure drop is found, the cell isolation procedure terminating if the integrity check is unsuccessful;

5. Performing a cell isolation sequence in step 560, the steps in the sequence to be performed being dependent upon the parameters that have been configured in step 554 and being defined in a configuration file; and 6. Decoupling the carrier, liquid containers and biopsy kit in step 562 following performance of the cell isolation sequence.

Figure 14A:
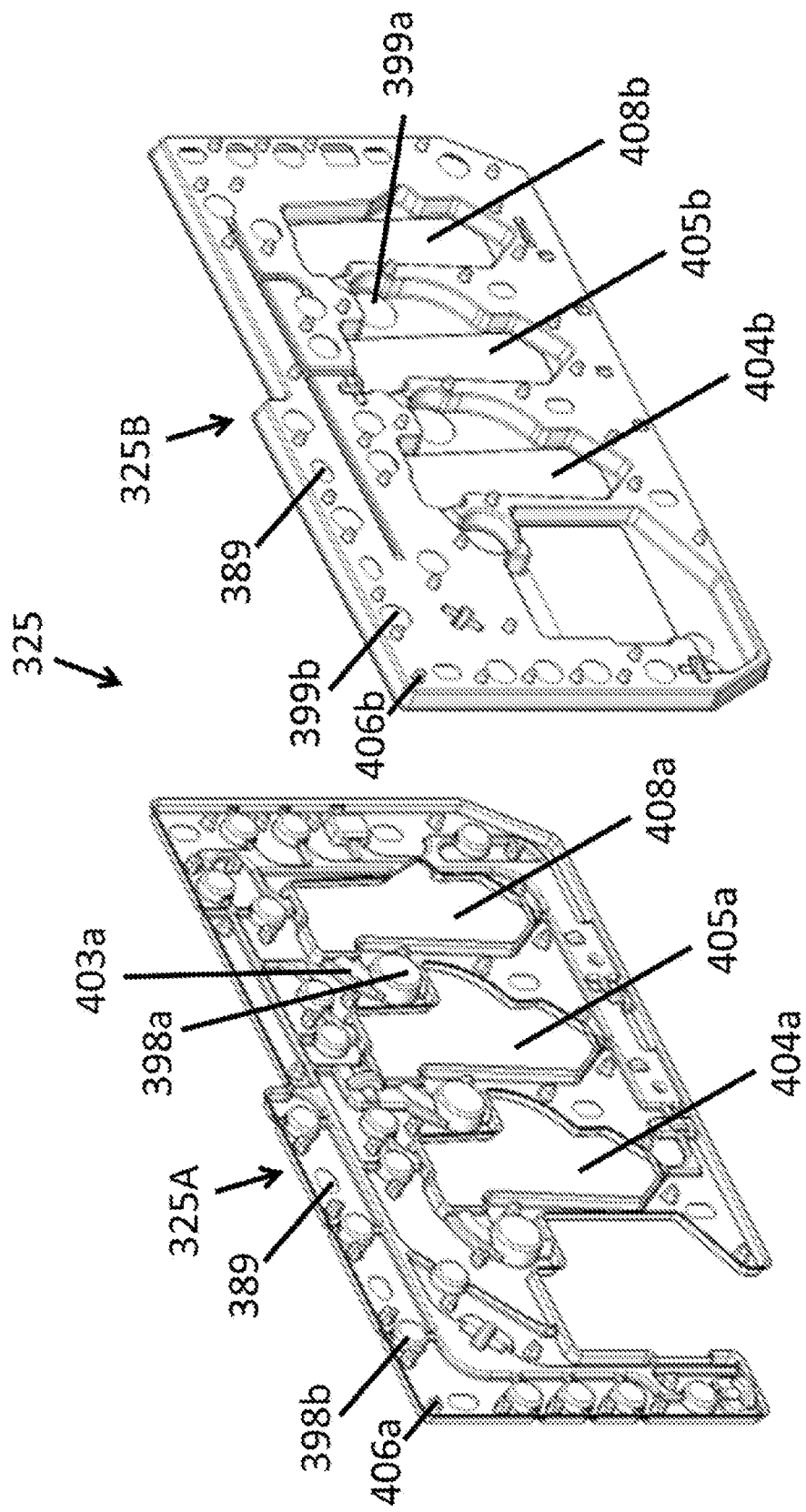
FIG. 14A is a perspective view of front and rear blister panels used in conjunction with the carrier of FIG. 13B, prior to introduction of tubes and prior to being connected together.
Figure 14B:
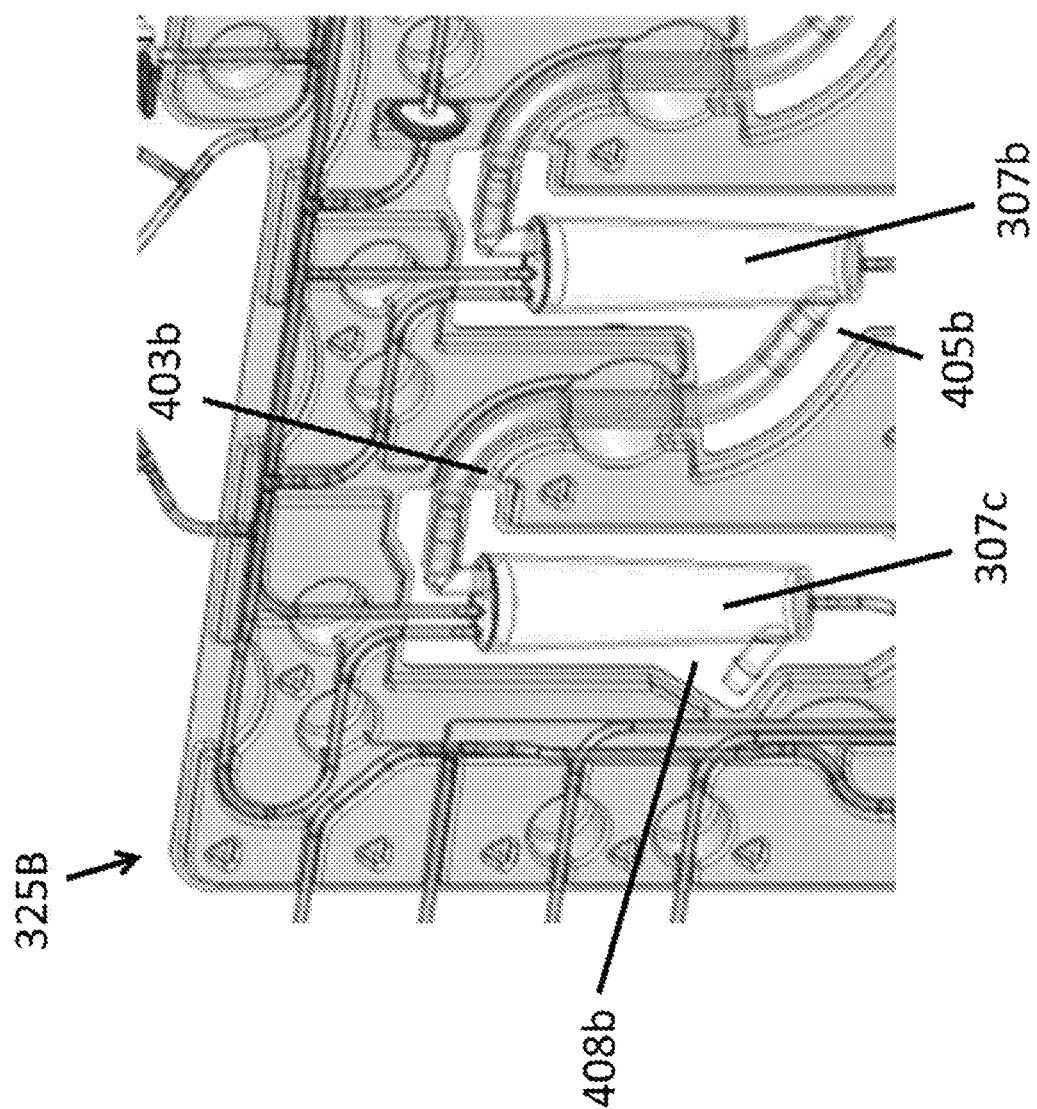
FIG. 14B is a perspective view from the front of a portion of the rear blister panel of FIG. 14A, showing process containers and tubes received therein.

FIGS. 14A-B illustrate the structure of disposable carrier 325, which is shown to have a substantially rectilinear shape. Carrier 325 comprises mating front blister panel 325A and rear blister panel 325B that are assembled together in a clean room to define a monolithic part which is very rigid and easy to handle. Carrier 325 is adapted to enclose each tube system through which liquid discharged from the liquid distribution unit is selectively flowable and to hold all interfacing elements in a predetermined position. That is, the process containers are held by carrier 325 in such a way that they are free to move and be inserted into the shaker. The filters and check valves are also well enclosed. Since all interfacing elements are held by carrier 325 in a predetermined position, the user is able to couple the entire main disposable to the housing at once without risk of human error.

Blister panel 325A has a plurality of snap-in catches 406*a*, which are configured to be received by a friction fit in corresponding cavities 406*b* provided with blister panel 325B to facilitate a strong connection therebetween. Dedicated apertures 389, e.g. oval, for receiving the lock handle of a corresponding securing unit 363 (FIG. 15A) are formed such that a first aperture 389 of panel 325A is aligned with a second aperture of panel 325B.

Blister panel 325A also has a plurality of individually shaped and sized grooves 403*a*, each of which is configured to receive a dedicated tube of a tube system and be positioned in positional relation with a corresponding groove 403*b* of blister panel 325B, such that the wall of the two grooves 403*a* and 403*b* are set in abutting relation with each other and enclose the dedicated tube. Protruding valve covers 398*a-b* of blister panel 325A, which coincide with corresponding rotary pinch valve assemblies 361 (FIG. 23B) by an accurate positional relation, protect the fingers of a user from being injured upon inadvertent insertion into one of the pinch valve assemblies. The valve covers 398*a-b* are configured to be received in corresponding cutouts 399*a-b* of blister panel 325B, which provide a clearance rearwardly to a portion of a tube adapted to be received in an interspace of the corresponding pinch valve assembly.

Cutouts 404*a*, 405*a* and 408*a* provided with blister panel 325A which are adapted to be aligned with cutouts 404*b*, 405*b* and 408*b* provided with blister panel 325B, respectively, define carrier regions in which a corresponding process container is able to be positioned. Process container 307*c*, for example, is shown to be positioned with aligned cutouts 408*a-b* and process container 307*b* is shown to be positioned with aligned cutouts 405*a-b*.

The various fixation actions that are performed with respect to the carrier of the main disposable, the process and biopsy containers, and the tube system will now be described.

Figure 15A:
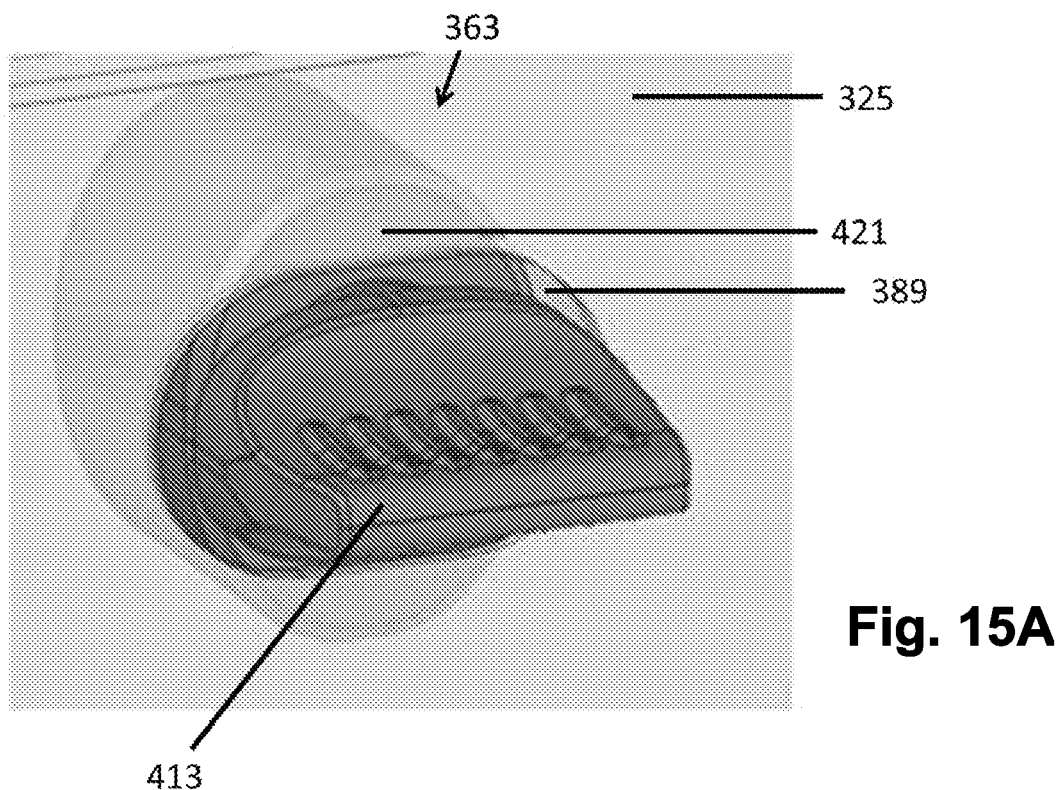
FIG. 15A is a perspective view from the front of a securing unit used in conjunction with the cell isolation device of FIG. 12, showing when the carrier is fitted over a lock handle.
Figure 15B:
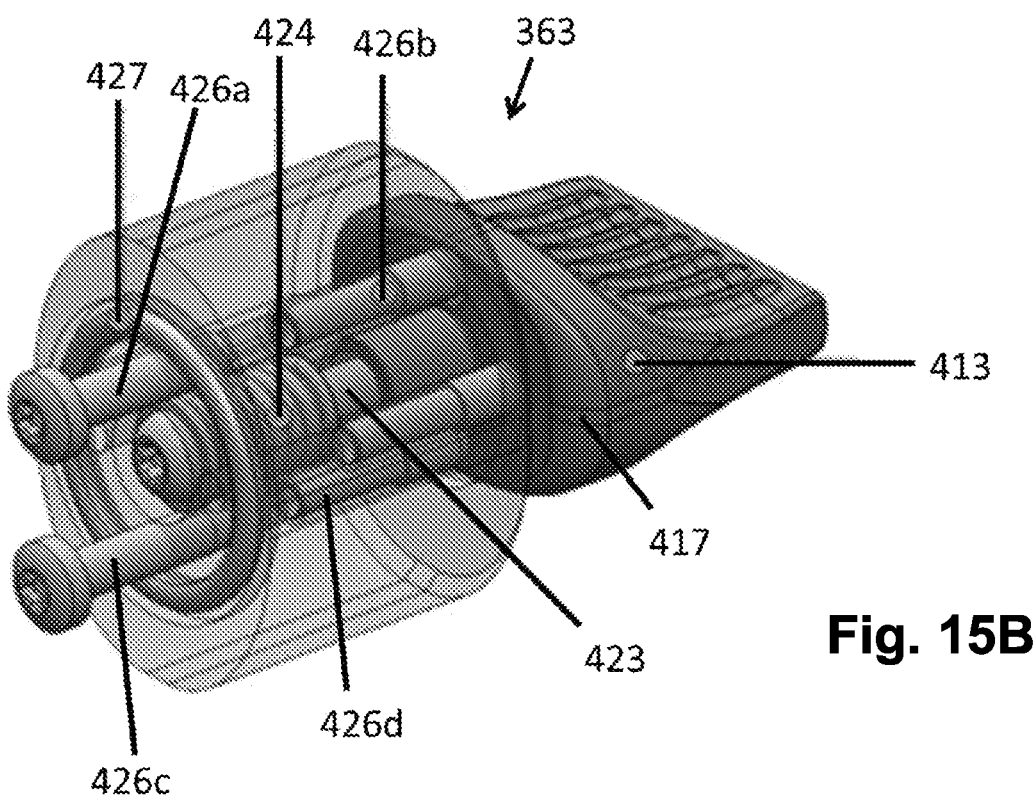
FIG. 15B is a perspective view from the side of the securing unit of FIG. 15A, shown when the stop collar thereof is transparent.

A securing unit 363 for securing the carrier to the housing is illustrated in FIGS. 15A-B. Securing unit 363 comprises a lock handle 413 that protrudes forwardly from a corresponding stop collar 421 fixed to the front housing panel, which is shown to be tubular, but which can be differently shaped. Lock handle 413 extends forwardly from a substantially vertical oval base 417, and may be concave and provided with a plurality of grip elements for increased interdigital grippability. A shaft 423 fixedly connected to base 417 and equipped with a spring 424 is rotatably mounted in the front panel. A plurality of circumferentially spaced posts 426*a-d*, such as four, radially spaced from shaft 423 extend forwardly from housing front panel 317 (FIG. 13A) while passing through front and rear openings of stop collar 421. The same number of circumferentially spaced recesses as posts is formed in base 417. A sealing element 427 such as an O-ring applied around a mounting element provided at the rear opening of stop collar 421 and penetrating the front panel prevents seepage of liquid from a component of the carrier via an edge of the mounting element into the housing interior.

In order to secure the carrier 325 to the housing, each aperture 389 is passed over a corresponding lock handle 413 until the carrier contacts the stop collars 421. Each lock handle is positioned at a different front panel location to ensure carrier stability. When carrier 325 is set in place within the small clearance between each lock handle 413 and the corresponding stop collar 421, the lock handles 413 are rotated about their shaft 423, such as by 90 degrees, and are held in position by spring 424, such that each post is received in a corresponding recess formed in base 417 and each lock handle 413 applies a clamping force to carrier 325. This procedure is reversed when it is desired to decouple carrier 325 from the housing. The rotational position of each lock handle 413 provides a clear feedback as to its locked state, whether locked or unlocked.

After the carrier is secured to the housing, each corresponding sterile connector integrated between a tubing system and one of the media bags and enzyme bags is preferably fixated to prevent damage to the carrier or to prevent any error during liquid distribution.

Figure 16:
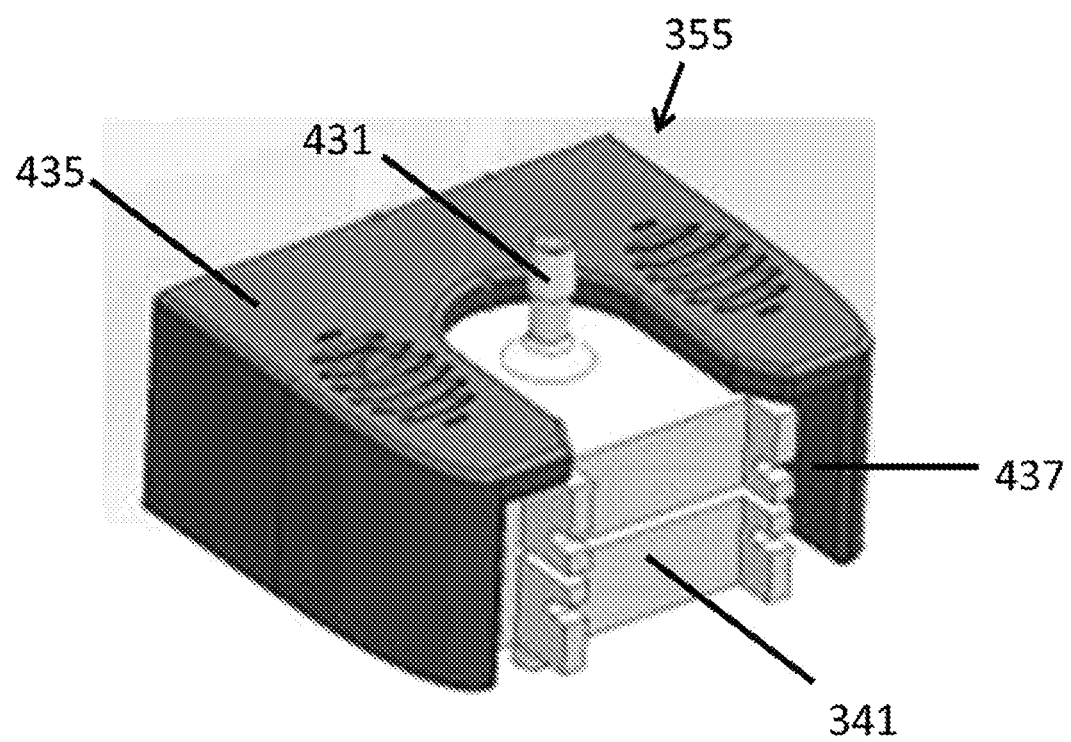
FIG. 16 is a perspective view from the bottom of a sterile connector holder used in conjunction with the cell isolation device of FIG. 12.

A holder 355 for a typical sterile connector 341 is illustrated in FIG. 16. Sterile connector 341 is typically the genderless AseptiQuik AQS17002 connector manufactured by CPC, Roseville, MN, USA, which comprises two halves that are sterilely connected together and provided with a safety latch to remove a membrane before use, but may be other types of sterile connectors as well. Holder 355 has an upper surface with an opening and an opposite lower surface with an opening to accommodate the extension therethrough of interconnected hose barbs 431 upwardly and downwardly, respectively, and a front opening 437 which is sufficiently wide to allow the upper half to pass through. When the lower connector half is inserted from below, the pair of connector halves is pressed against lower surface 435, and is forced to be locked together. Such a tight fit mitigates the danger of detachment of a tube from a tube system of the disposable carrier following manipulation of a safety latch.

Figure 17:
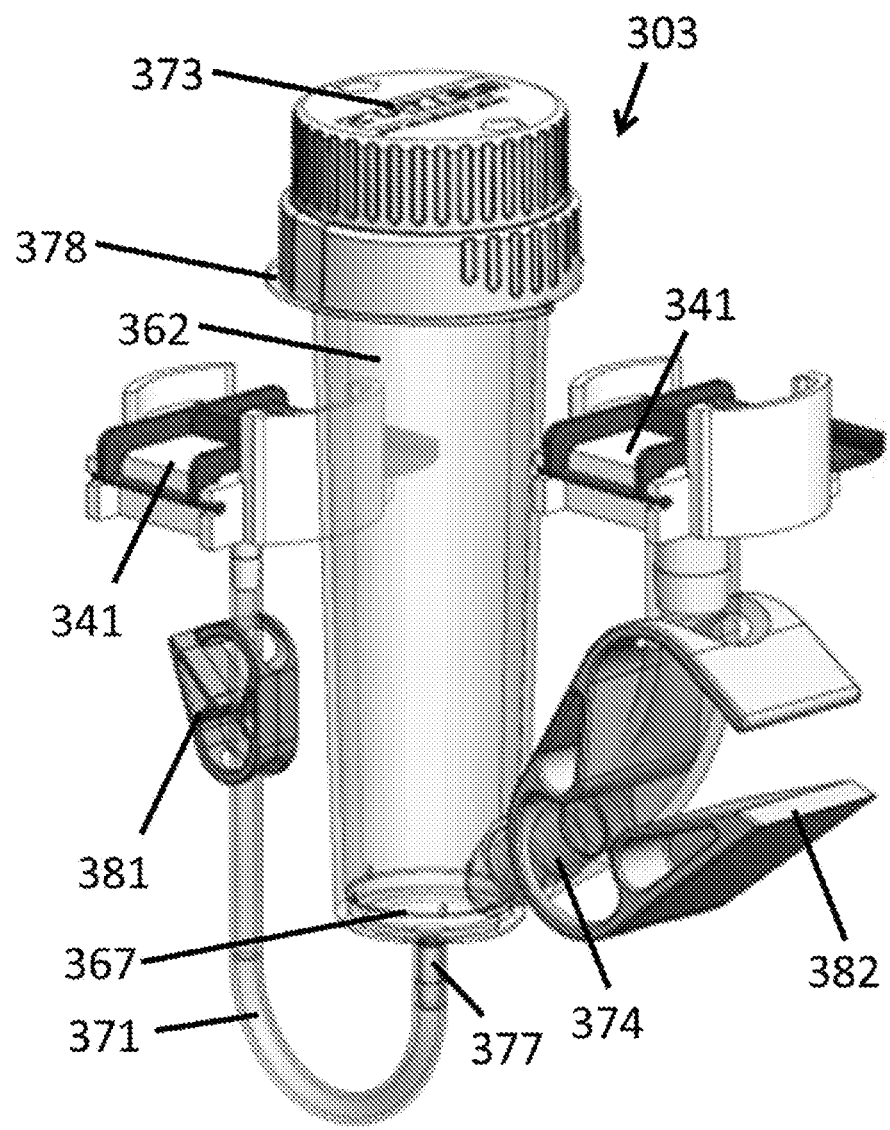
FIG. 17 is a perspective view of a biopsy kit used in conjunction with the cell isolation device of FIG. 12.

Biopsy kit 303 is illustrated in FIG. 17. Biopsy kit 303 is equipped with basic container 362 having an annular cross section and a circumferential wall that is slightly downwardly inclined. Each process container 307 shown in FIG. 20 also employs the same basic container 362. Biopsy kit 303 also has two pre-assembled tube connections, which respectively constitute upon connection to the carrier, an inlet flushing tube 371 extending to an inlet port 377 in communication with an aperture formed in the bottom 367 of container 362 and an outlet flushing tube 374 extending obliquely upwardly from an opening in the container wall slightly above bottom 367. A sterile connector 341 is connected to the terminal end of each of flushing tubes 371 and 374. A lid 373, such as an upper portion thereof, is threadedly engageable with threading 376 (FIG. 20) provided at the top of container 362.

Figure 18:
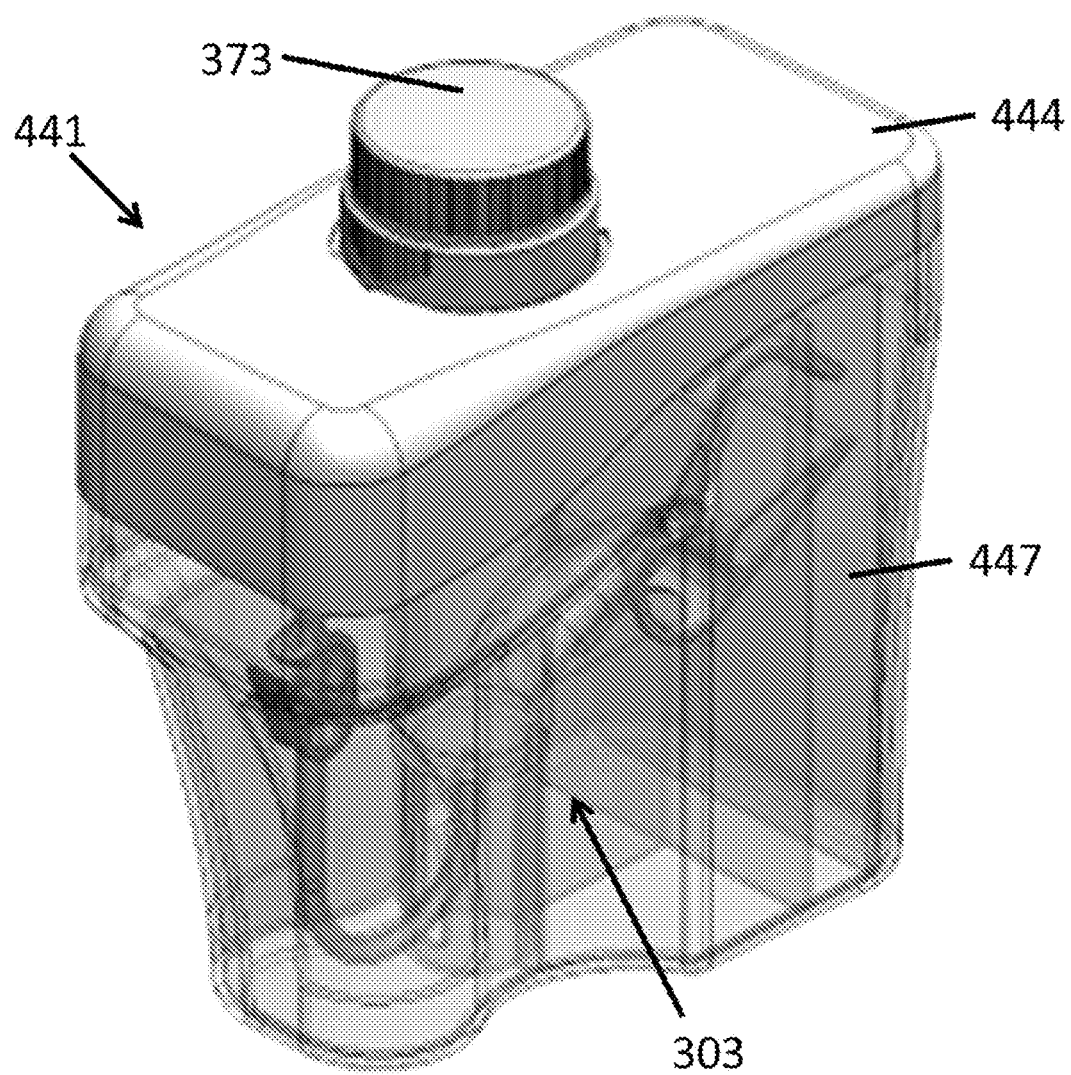
FIG. 18 is a perspective view of a transport container for protectively retaining the biopsy kit of FIG. 17, shown when its container body is transparent.

With reference also to FIG. 18, biopsy kit 303 is adapted to be protectively retained in transport container 441 when located at a biopsy extraction site such as a hospital or during transit from the biopsy extraction site to the laboratory site where the cell isolation device is located in order to perform a cell isolation procedure. Transport container 441 is able to be self-standing when positioned on top of a suitable surface such as a laboratory table by virtue of its planar bottom 449 and relatively high container body 447 having walls made from a high strength and impact resistant material such as polycarbonate that extend upwardly from bottom 449. A three-dimensional cover member 444 configured with an aperture through which biopsy container 362 protrudes is releasably fixed to body 447. Cover member 444 is separated from body 447 together with lid 373 so that biopsy kit 303 will be able to be removed from the body and be connected to the carrier.

Figure 19:
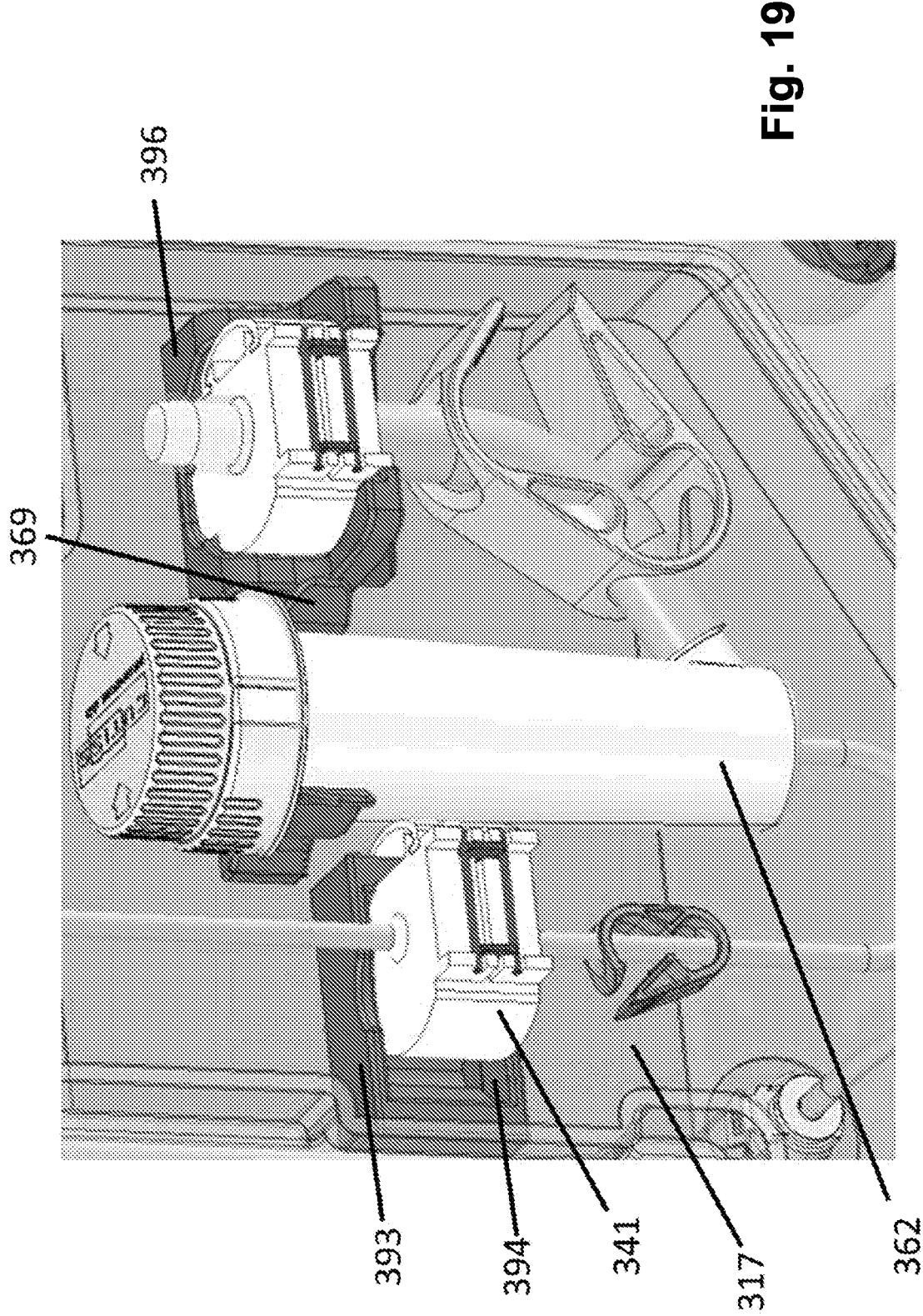
FIG. 19 is a perspective view of the biopsy kit of FIG. 17 when held by the housing front panel.

Lid 373, which is generally replaced at the biopsy extraction site, may be equipped with a twist lock mechanism, such as a catch that is engageable when the lid is downwardly twisted, housed in a wider-diameter lower lid portion, which may be hand deformable, to prevent the lid from being accidentally twisted off biopsy container 362 during transport. The twist lock is able to be released by pressing on lid 373 when it is being unscrewed at a position that is separated by e.g. 90 degrees from its position when locked. Lid 373, when fully engaged with threading 376, is adapted to contact spaced intermediate annular rim 378, which radially extends from the wall of biopsy container 362 and is used to fixate biopsy kit 303 to transport container 441 and also to rest on holder 369 (FIG. 19). Clamps 381 and 382 fitted on flushing tubes 371 and 374, respectively, serve to retain liquid within basic container 362 without flowing out of sterile connectors 341 and compromising their sterile barrier.

Once the transport container arrives at the laboratory site, biopsy kit 303 is removed from the transport container and mounted onto the housing in order to be coupled with one or more tubes provided with the carrier.

As shown in FIG. 19, biopsy container 362 is releasably secured within biopsy container holder 369, which is configured as a flexible C-shaped clamp with a rear mounting element connected to front panel 317. To accommodate the limited front panel unoccupied room in the vicinity of holder 369, two different holders 393 and 396, each for holding a pair of connector halves of a sterile connector 341 of the biopsy kit by a tight fit, are provided. Holder 393 has a rectangular frame with upper and lower beveled frame elements 394 that assist in reducing the force necessary to connect the two connector halves. When it is desired to pull the safety latches and connect the connector halves together, the connector halves may be pushed against front panel 317 to minimize the jolt. Sterile connector holder 396 is configured similarly to holder 355 of FIG. 16, but without the upper surface.

The two connector halves may be connected together outwardly from holder 396 or by finger pressure within the holder.

Figure 20:
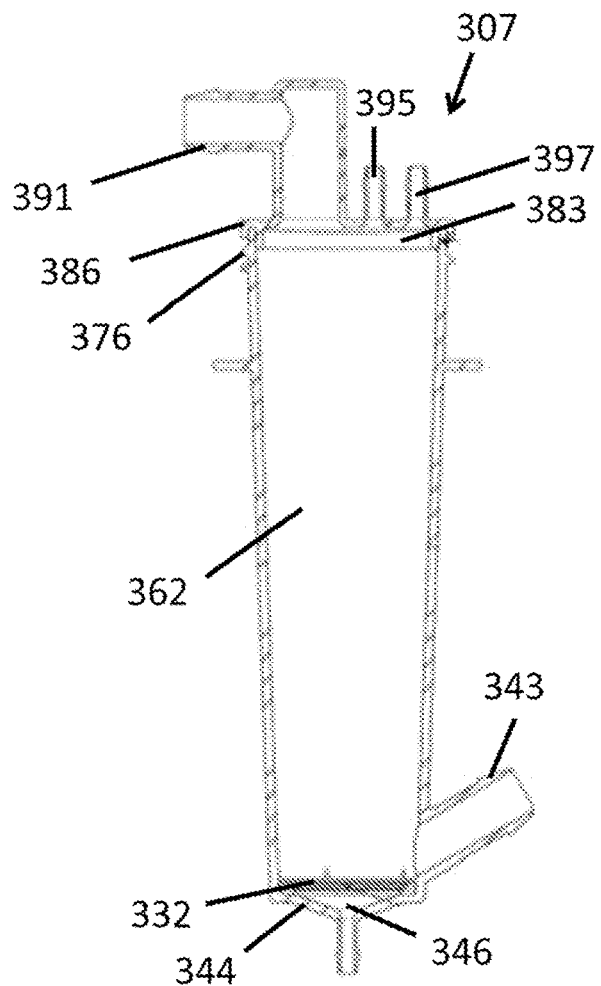
FIG. 20 is a vertical sectional view of a process container used in conjunction with the cell isolation device of FIG. 12.

As shown in FIG. 20, a process container 307 is configured with basic container 362 and with a lid 383 fixed to the upper edge 386 of the circumferential wall of basic container 362 located above threading 376. For example, lid 383 is bonded to upper edge 386 by an UV-curable adhesive. An angled inlet fitting 391, such as a perpendicular fitting, is integrated to lid 383 to provide a good bubbling effect upon flow of the introduced liquid downwardly along the circumferential wall, a vortex action to wash away skin pieces that have adhered to the circumferential wall, and tubing of reduced length that extends between adjacent process containers. Two more fittings 395 and 397 integrated with, and extending upwardly from, lid 383 may be used to connect process container 307 with two other tubing systems, respectively.

A cell strainer 332 for filtering larger particles is fitted slightly below angled outlet 343 and slightly above funnel-shaped lower section 344 of the basic container that leads the filtered liquid downwardly to central aperture 346. The upwardly extending angled outlet 343 reduces the risk that liquid or skin pieces will flow into the outlet when undergoing a vortex motion and also promotes a shortened length of tubing that extends between adjacent process containers.

Figure 21A:
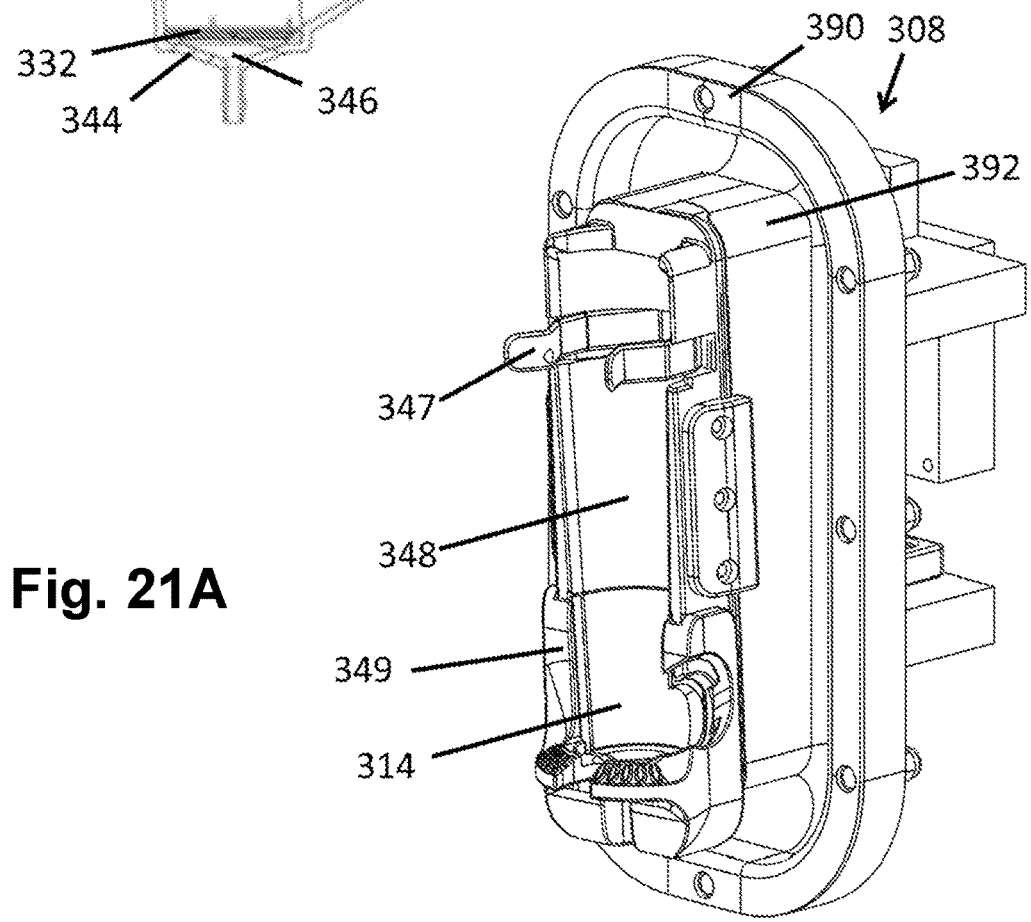
FIG. 21A is a perspective view from the front of a shaker-holder module used in conjunction with the cell isolation device of FIG. 12.
Figure 21B:
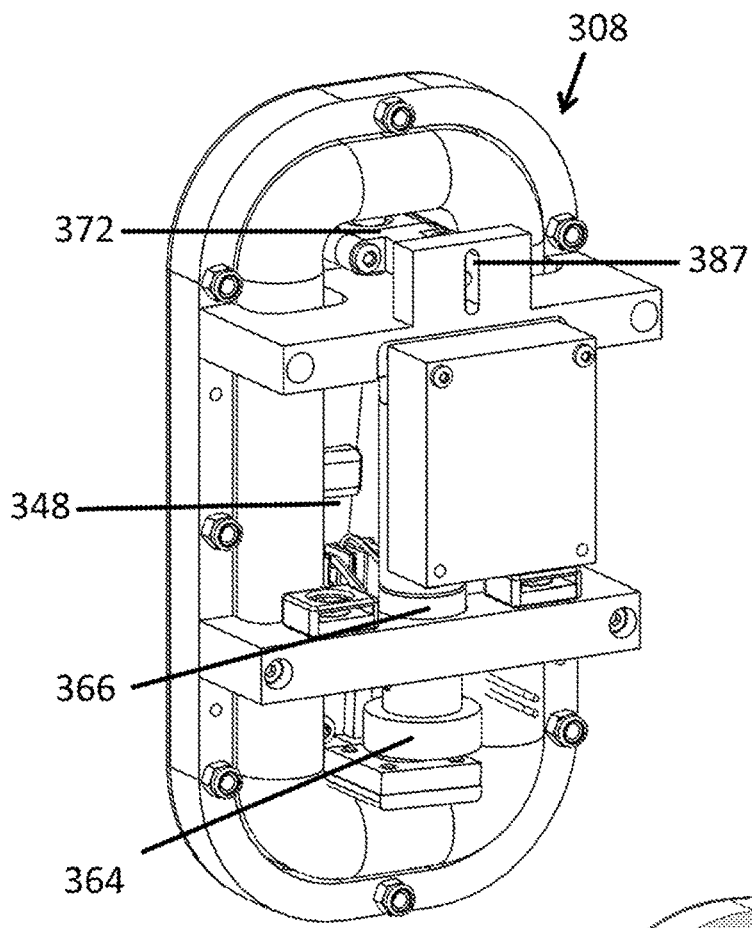
FIG. 21B is a perspective view from the rear of the shaker-holder module of FIG. 21A.
Figure 21C:
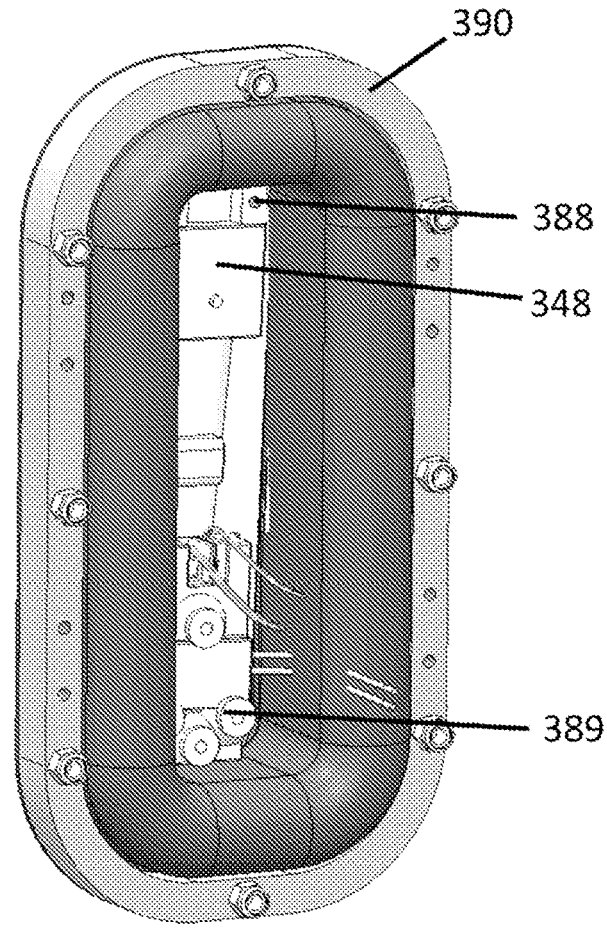
FIG. 21C is a perspective view from the rear of the shaker-holder module of FIG. 21A, shown when the precession drive is removed therefrom.

A process container is adapted to be held by a corresponding shaker-holder module 308 which is illustrated in FIGS. 21A-C.

The process container, after being originally retained by the carrier, is able to be rearwardly displaced by the user so as to be held in place by a flexible C-shaped clamp 347 mounted on a container holder unit 348. Container holder unit 348 in turn is movably connected with a lower slider 349, which surrounds the holder unit and is configured to be downwardly and releasably displaced when the process container is manually pushed in during engagement with clamp 347 or pushed down during removal of the process container, until the process container is supported by a bottom element of the slider. Contact heater 314 is integrated with a front portion of holder unit 348. Container holder unit 348 has a surrounding sealing sleeve 392 that is attached to a mounting frame 390, e.g. oval, to decrease the possibility of spilled liquid infiltrating to electronic components mounted within the housing or to prevent the squeezing of fingers during operation of the housing.

The shaker unit of module 308 is similar to shaker device 8 of FIG. 9 in that it comprises a motor 366 coupled with a gear, a flywheel 364 eccentrically driving the bottom of container holder unit 348, e.g. with 3 to 6 mm eccentricity. At the top of container holder unit 348, a pin and a spherical joint 372 sliding vertically thereon provide sufficient degrees of freedom to facilitate the precession pattern. An additional pin, sliding in a slot 387 at the rear of module 308 ensures that the shaker unit remains mounted in axis.

Accordingly, the shaker unit is able to undergo a precessional pattern wherein the radius of the cyclical rotary motion can be increased, for example in 1-mm increments from 3 mm to 6 mm. Through fast changes in the rotational direction, chaotic shaking can be achieved, for example in a separation procedure to generate air bubbles within the contained liquid and to help the epidermis to float. Vortexing without a fast directional change forces the air bubbles out of the liquid and can cause the epidermis to sink to strainer 332 (FIG. 20).

Additionally, the shaker unit is able to undergo other shaker motions as well such as simpler tilting motions and high frequency vibrations. When the precession drive is removed, another drive may be attached to the back of container holder unit 348, such as by two mounting holes at an upper region 388 and four mounting holes at a bottom region 389.

Another coupling action that the user performs is the coupling of an entire tube system with the plurality of pinch valves when standing forwardly to the housing. This simple and speedy coupling action is made possible by virtue of a novel pinch valve assembly illustrated in FIGS. 22A-C and 23A-C that protrudes forwardly from the housing front panel. An interspace is provided within the pinch valve assembly within which a tube is restrictedly insertable. An elongated tube is consequently able to be restrictedly inserted within the interspace of a plurality of adjacent pinch valve assemblies, whether horizontally or vertically spaced. Also, each tube is visible, allowing the user to readily determine whether the tube is in a pinched or unpinched condition. As referred to herein, a "pinched condition" is interchangeable with a closed state, and an "unpinched condition" is interchangeable with an open state of a pinch valve.

Figure 22A:
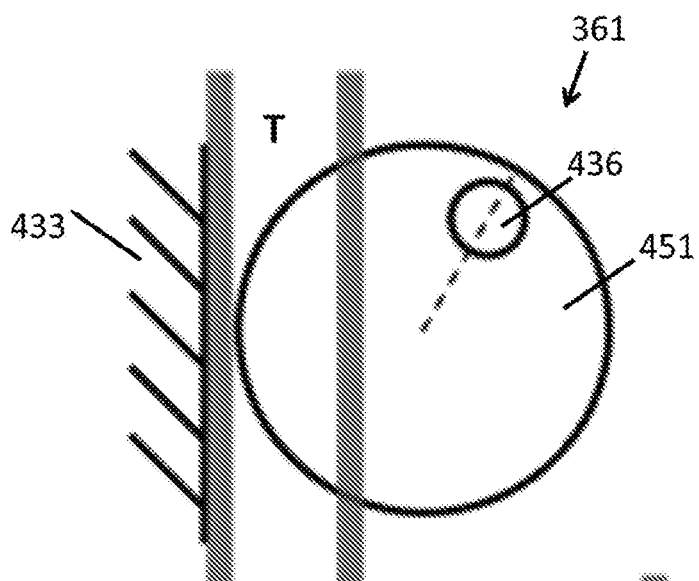
FIG. 22A is a schematic illustration of a pinch valve assembly used in conjunction with the cell isolation device of FIG. 12, shown when an inserted tube is in an unpinched condition.
Figure 22B:
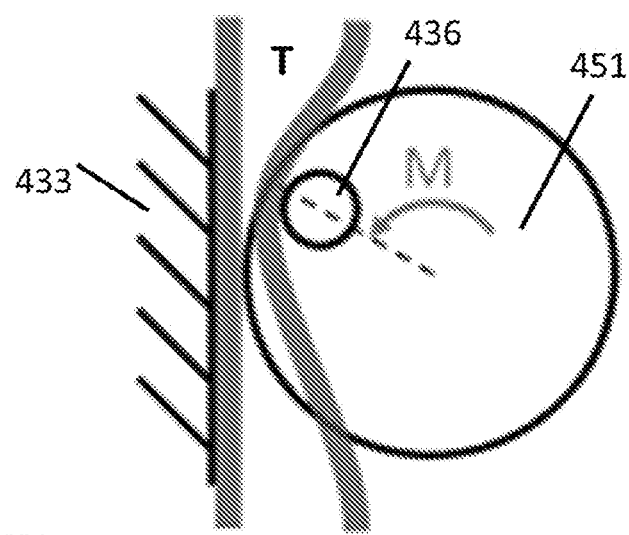
FIG. 22B is a schematic illustration of the pinch valve assembly of FIG. 22A, shown when in a pinched condition.
Figure 22C:
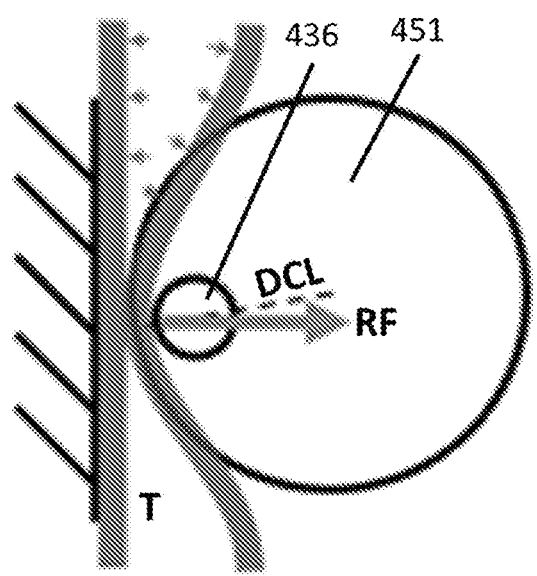
FIG. 22C is a schematic illustration of the pinch valve assembly of FIG. 22A, shown when in a pinched and self-locked condition.

FIGS. 22A-C schematically illustrate the operation of pinch valve assembly 361. A tube T through which liquid is flowable is shown in FIG. 21A to be positioned within an interspace between stationary abutment 433 and rotating pin 436, which is eccentrically mounted in hub 451. Tube T is transparent or translucent, allowing the user to visually inspect whether a skin piece is lodged within the tube. When torque M is applied onto hub 451, pin 436 eccentrically rotates about the center of hub 451 and approaches abutment 433 as shown in FIG. 21B, causing tube T to be partially pinched. To ensure that tube T remains pinched while the electric drive that rotatably drives hub 451 is deactivated, pin 436 is eccentrically rotated slightly, such as by a few degrees, e.g. 5 degrees, beyond the dead center line (DCL), along which the maximum reactive force by the abutment acts to cause a corresponding maximum tube compression, in the same direction of rotation as torque M, as shown in FIG. 22C. At this rotational position beyond the DCL, the compressed tube T applies a relaxation force RF onto pin 436 in response to the plastic strain generated within the tube structure that would generally cause the pin to additionally rotate in the same direction of rotation as torque M. This additional rotation is prevented by a hard-stop portion 489 shown in FIG. 23C, leading to powerless self-locking by which flow of liquid through tube T is temporarily terminated. To open pinch valve assembly 361 and resume flow of liquid through tube T, pin 436 has to be rotated in an opposite rotational direction beyond dead center line DCL.

Figure 23A:
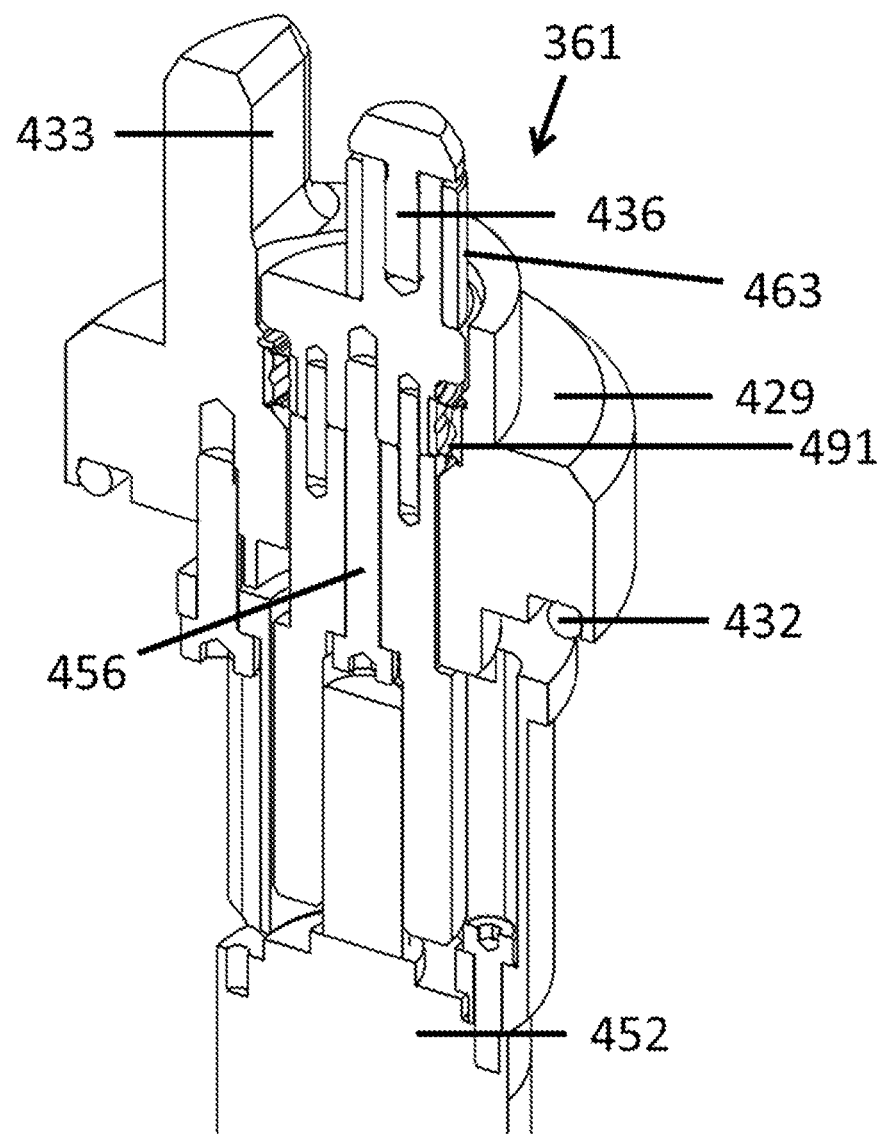
FIG. 23A is a perspective, vertically sectioned view of the pinch valve assembly of FIG. 22A.
Figure 23B:
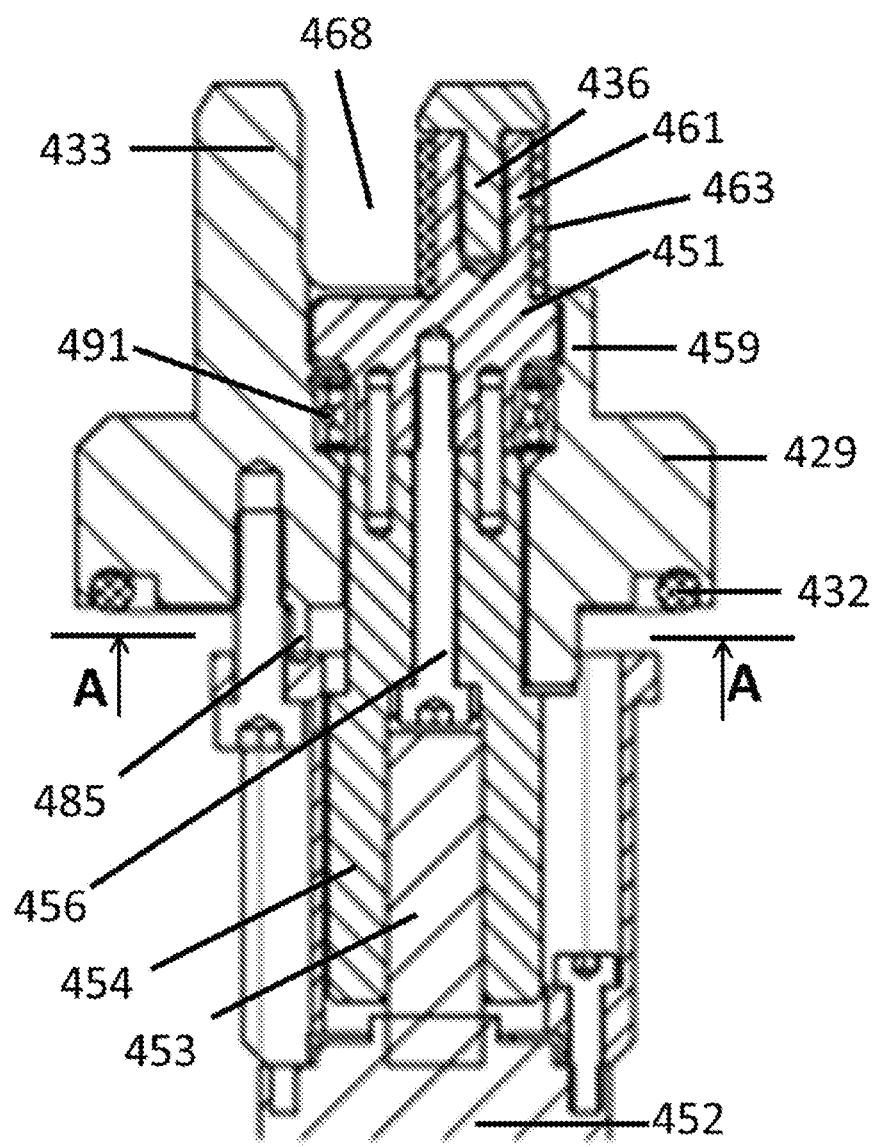
FIG. 23B is vertical cross sectional view of the pinch valve assembly of FIG. 22A.
Figure 23C:
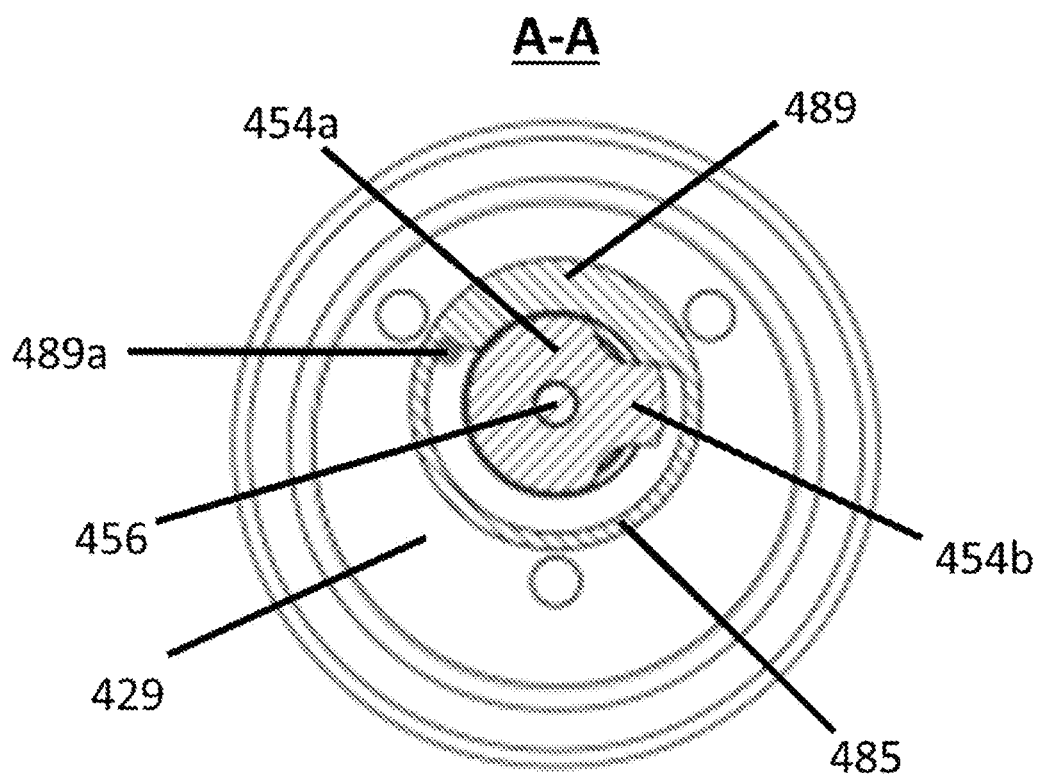
FIG. 23C is a horizontal cross sectional view of the pinch valve assembly of FIG. 22A, cut along plane A-A of FIG. 23B.

FIGS. 23A-C illustrate the structure of pinch valve assembly 361. Circular boss 429 forwardly protrudes from the housing front panel and is in sealing relation therewith by annular sealing element 432. Electric drive 452, such as a brushless motor, is in driving relation with gearbox 453, and its output shaft 456 coinciding with the longitudinal axis of boss 429 extends through the rotatable adaptor 454 which is connected to hub 451. Hub 451, which is rotatably driven by output shaft 456 when electric drive 452 is activated, is surrounded by annular collar 459 projecting forwardly from boss 429.

Hub 451 has an eccentric peg 461 within a bore of which pin 436 is fixedly mounted. To minimize stress on the tube during the pinching process and to ensure that the valve will be able to be optimally pinched and closed, pin 436 is covered by a plain bearing 463, which may be calibrated to the wall thickness of the tube. Hub 451 may be provided with bearing 491 that is suitable to support both radial and axial loads to ensure precise pinching. Abutment 433 of a limited length and of a rectangular cross section projects forwardly from boss 429 to a distance from the boss that is approximately equal to the spacing between the forward head of pin 436 and the boss. Interspace 468 within which the tube is insertable is defined between abutment 433 and pin 436.

A thin-walled circular protrusion 485 having approximately the same radial distance from output shaft 456 as abutment 433 protrudes rearwardly from boss 429. Hard-stop portion 489 for limiting the rotation of pin 436 extends radially inwardly, for a limited circumferential length, e.g. of 140 degrees, from thin-walled circular protrusion 485 to the outer periphery of the circular main portion 454a of the adaptor. The adaptor also has a radial portion 454b radially extending from main portion 454a for a radial distance from output shaft 456 greater than that of main portion 454a but less than that of circular protrusion 485. Radial portion 454b, which may be truncated, has a limited circumferential length of e.g. approximately 30 degrees and a limited axial length which may be equal to, or greater than, the axial length of thin-walled circular protrusion 485. Adaptor radial portion 454b is circumferentially spaced from hard-stop portion 489 by a specific distance that allows pin 436 to eccentically rotate without interference when the pinch valve is set to an unpinched condition but that ensures contact with a circumferential edge 489a of the hard-stop portion to facilitate self-locking when the pin has eccentrically rotated slightly beyond the DCL.

Various components for maintaining temperature control will now be described.

Figure 24A:
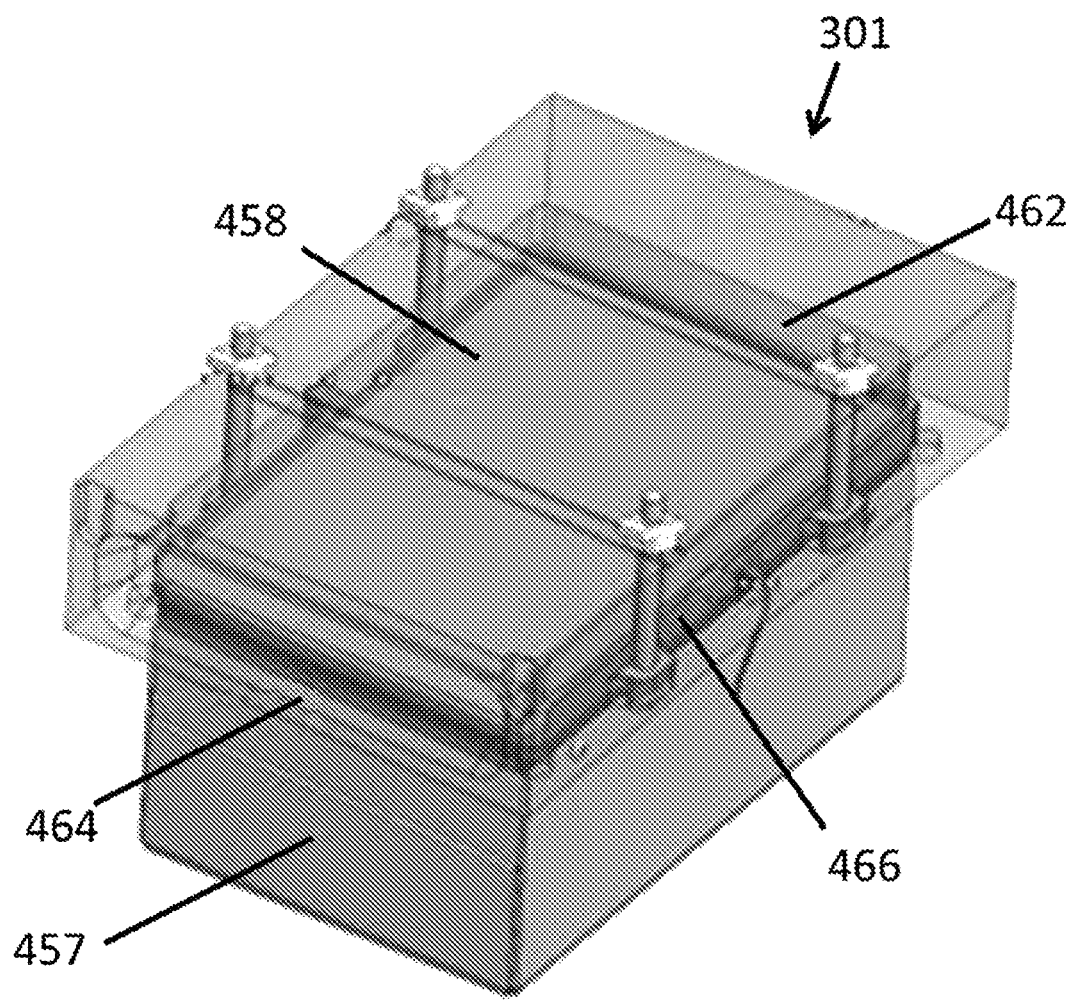
FIG. 24A is a perspective view from above of a climate control chamber used in conjunction with the cell isolation device of FIG. 12, shown when transparent.
Figure 24B:
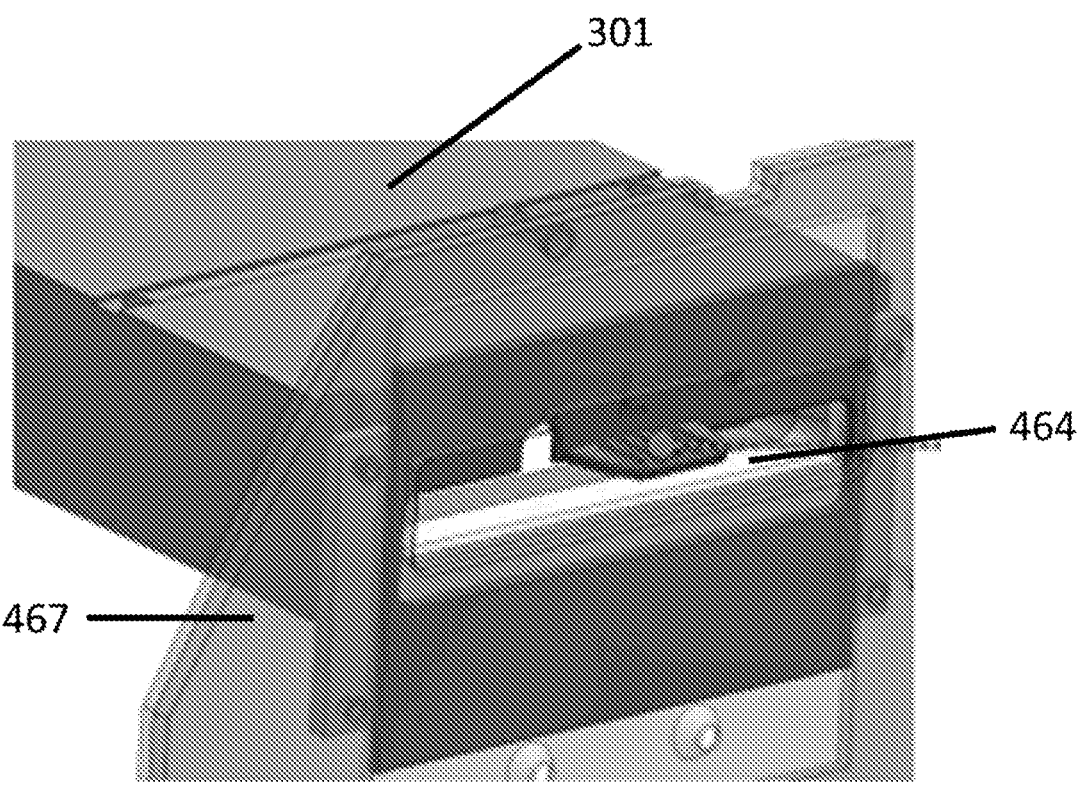
FIG. 24B is a perspective view from the front of the climate control chamber of FIG. 24A, showing a sliding door.

FIG. 24A-B illustrate a climate control chamber 301 within which an enzyme bag is adapted to be controllably refrigerated, for example to a temperature of approximately 4° C., or controllably heated, for example to a temperature of approximately 37° C., by conduction. Climate control chamber 301 is temperature regulated by means of a Peltier unit 457, for example one manufactured by UWE Electronic GmbH, Unterhaching, Germany, which is in contact with a cooling/heating body 458 positioned at the bottom of chamber 301. Symmetric body 458 may be made from aluminum, e.g., 6082-aluminum, by virtue of its high thermal conductivity and good machinability. A thermocouple may be provided within body 458 to avoid any hot or cool spots. A layer of thermal insulation 462, such as made of expanded polypropylene (EPP) with a density of 100 g/l, may cover body 458 and be provided with a front opening 464 to facilitate introduction and removal of the enzyme bags. A rim 466 provided with body 458, and also drip tray 321 (FIG. 13D), helps to contain any condensate from a climate control chamber or any spillage from the enzyme bags. Front opening 464 may be closed by a sliding door 467, which may be held in place at the opened and lowered positions by magnets. Components of sliding door 467 may be made from a plastic material such as polyamide to reduce thermal conductivity through the front portion of body 458.

An enzyme bag connected to the tube system remains in climate control chamber 301 throughout the cell isolation procedure, and enzyme flow is automatically controlled by the valve array.

Various measurement probes interspersed throughout the housing are adapted to measure the current temperature.

Figure 25:
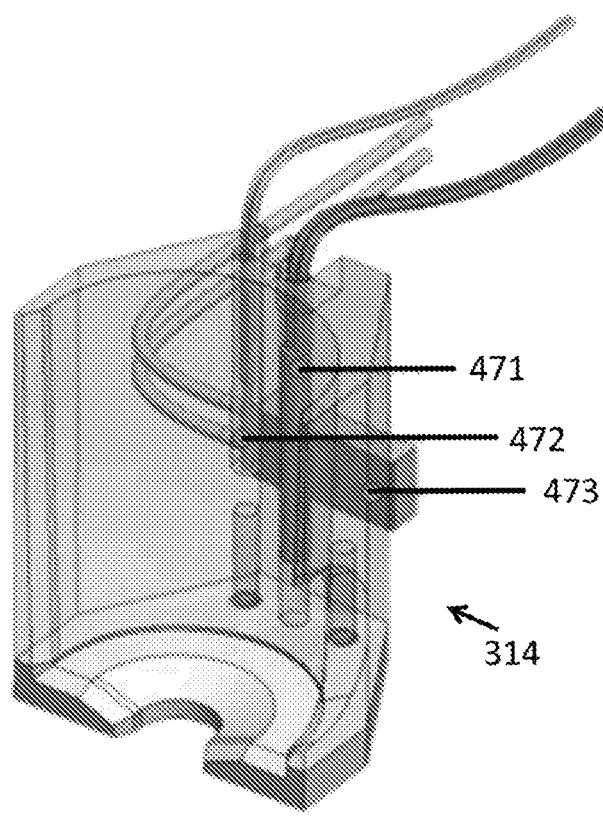
FIG. 25 is a perspective view of a contact heater used in conjunction with the cell isolation device of FIG. 12.

Contact heater 314 illustrated in FIG. 25 comprises a heater cartridge 471 that is centrally positioned on container holder unit 348 (FIG. 21A). A thermocouple 472 is equidistant from the cartridge and the heater surface to prevent the existence of a hotspot on the heater surface during regular foreseeable conditions. For user and device safety, a bimetal switch 473 may be connected to the rear surface of the heater body so that the heater will disconnect when the temperature is above 60° C. Container holder unit 348 provides additional insulation and protection against environmental influence such as flowing air.

The means for conveying tissue and liquid in conjunction with the valve array will now be described. In this embodiment, tissue and liquid are able to be controllably conveyed by a burst of compressed gas selectively introduced into one or more of the tubes and which is relatively quiet and under a minimal risk of contamination.

Figure 26:
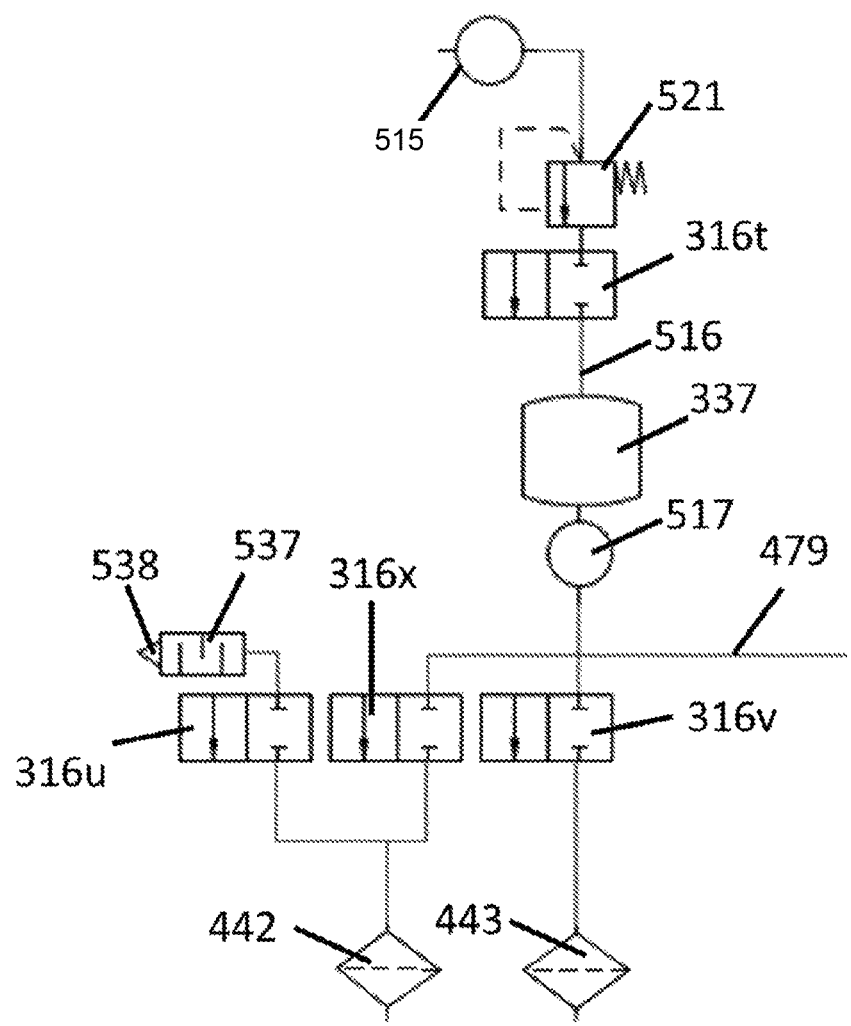
FIG. 26 is a schematic illustration of a compressed air system used in conjunction with the cell isolation device of FIG. 12.

As shown in FIG. 26, compressed air system 510 permanently mounted within the housing comprises a small gas tank 337, e.g. with a volume of 750 mL. The interior of gas tank 337 is continuously pressurized to a predetermined pressure, e.g. 0.3 bar, by membrane pump 515 which suctions environmental air. A pressure sensor 517 senses the pressure within gas tank 337 to ensure that the predetermined pressure will be maintained. The pressurized air is delivered to gas tank 337 via non-sterile tube 516, to which pressure relief valve 521 and pinch valve 316t are operatively connected. Membrane pump 515 is caused to be deactivated and pinch valve 316t is caused to close when the predetermined pressure is reached. Membrane pump 515 is then reactivated once pinch valve 316t is opened following determination that the sensed pressure within gas tank 337 has fallen below the predetermined pressure. If the pressure within gas tank 337 exceeds a high level such as 0.5 bar, for example when pinch valve 316t is set to a pinched condition and membrane pump 515 remains in operation, pressure relief valve 521 is commanded to open and to discharge some compressed air to the environment.

Once pinch valve 316v at the outlet of gas tank 337 is opened, the compressed air is delivered to a tube system deployed forwardly to the housing front panel. Another pinch valve 316x receives air discharged from a tube system following performance of a conveying operation, and transfers it to pinch valve 316u, from which the discharged air flows to a gas outlet 538 via muffler 537.

Figure 27:
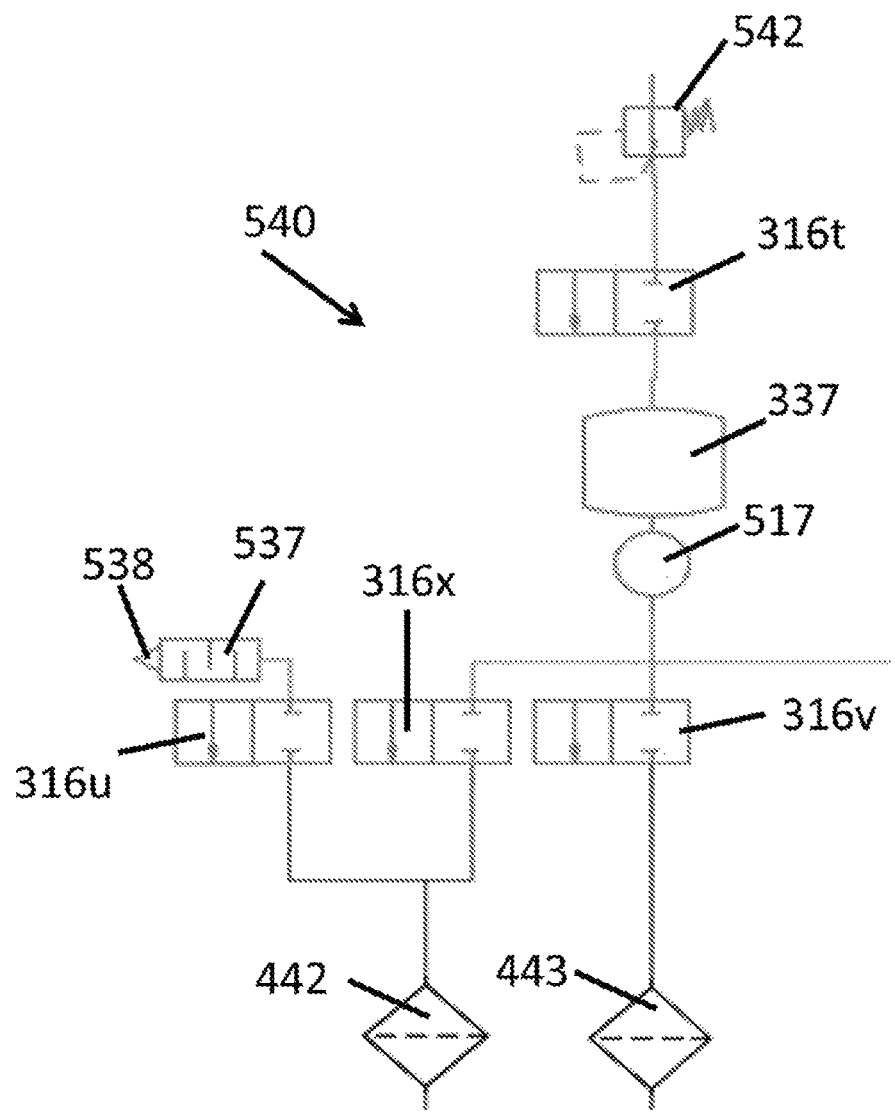
FIG. 27 is a schematic illustration of a compressed gas system used in conjunction with the cell isolation device of FIG. 12.

Alternatively with respect to compressed gas system 540 shown in FIG. 27 with which the membrane pump and pressure relief valve are dispensed, gas tank 337 is supplied with gas from an external tank, which is attached to the housing by a quick connector interface. A pressure reducer 542 connected to pinch valve 316t is adapted to reduce the pressure of the compressed gas, such as carbon dioxide enriched air, e.g. containing 5% carbon dioxide used in cell cultures, or low-oxygen gas, from a high pressure generally ranging between 0.3-6 bar to a set pressure, e.g. 0.3 bar. Pinch valve 316t is adapted to permit inflow of the compressed gas to gas tank 337 until the set pressure is achieved, as detected by pressure sensor 517, whereupon pinch valve 316t closes. Reliable performance of the cell separation and isolation process is contingent upon flow of a predetermined pressure of the conveying gas. The hardware and software of the cell isolation device is preferably reconfigured when it is desired to supply gas tank 337 with gas rather than with environmental air.

Figure 28:
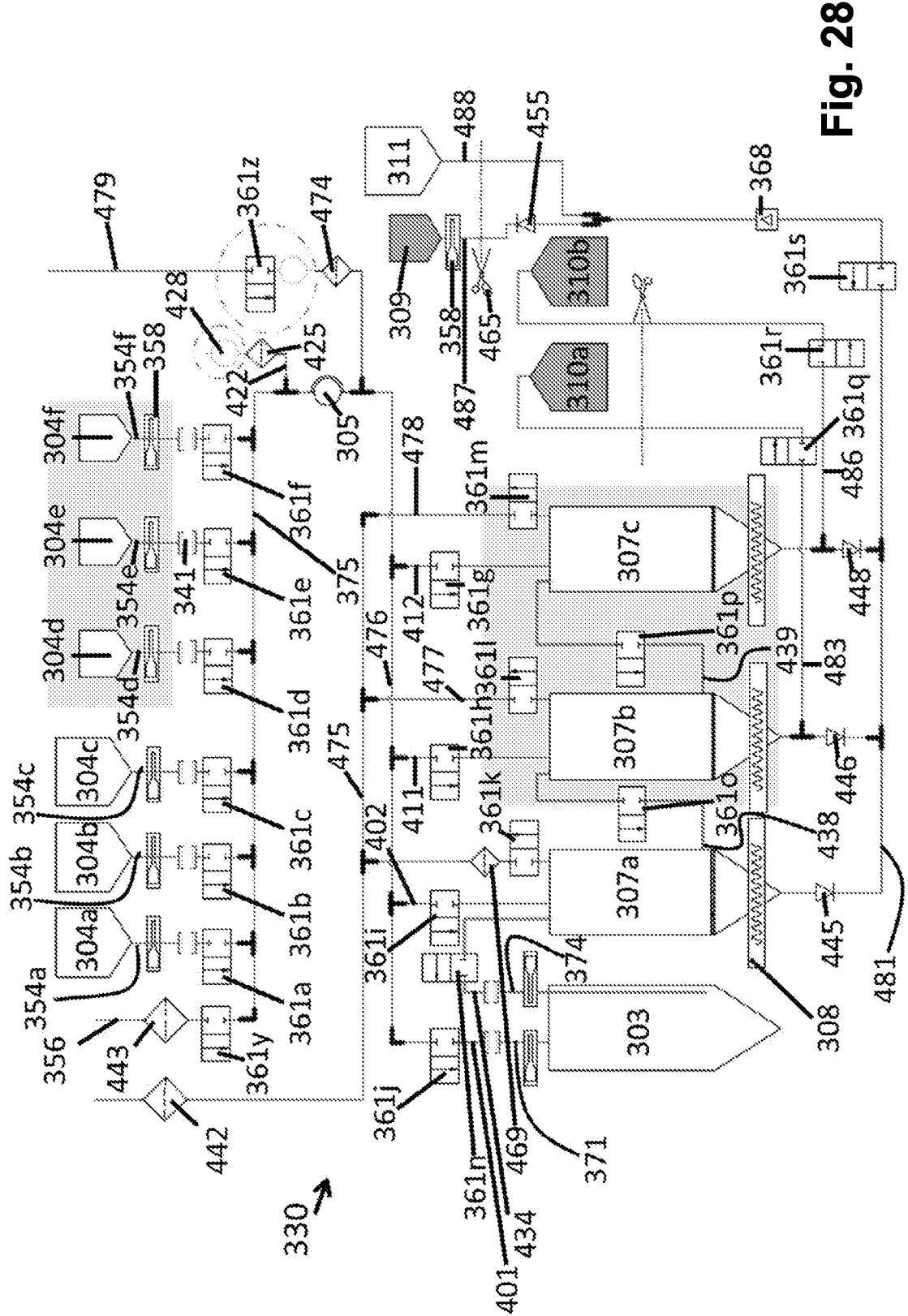
FIG. 28 is a schematic illustration of a cell separation and isolation process performable in conjunction with the cell isolation device of FIG. 12.

FIG. 28 schematically illustrates the interconnections of the various components of cell isolation device 330 in conjunction with compressed air system 510. Unless specifically described otherwise, the prefilled liquids of the liquid distribution unit are the same types as those of cell isolation device 30 of FIG. 1.

Three different process containers 307a-c, e.g. each of 80 mL, are provided to sequentially process the solid sample received in biopsy kit 303 using one or more of a plurality of solutions derived from the liquid distribution unit by a selected protocol. Each of containers 307a-c is equipped with a corresponding shaker-holder module 308.

Regarding the fluid distribution unit, separate media or enzyme bags 304a-g are prefilled with a selected solution. Media or enzyme bags 304a-g may contain PBS, a washing solution, FBM, dispase, trypsin, and liberase, respectively. Media bags 304a-c may have a volume of 600-100 Ml, while media bags 304d-g may have a volume of 30-50 Ml.

Tubes 354a-g, e.g. medium sized with an inner diameter of 3.2 mm, which extend from media bags 304a-g, respectively, to a corresponding sterile connector 341, are fitted with a corresponding slide clamp 358, and additionally pass through pinch valves 361a-g, respectively, prior to extending to common tube 375.

Tube 356 through which compressed air from compressed air system 510 flows passes through pinch valve 316v, sterile filter 443, and pinch valve 361y until extending to common tube 375 with which it is fluid communication.

Common tube 375 extends to single peristaltic pump 305, the latter being downstream to each of the media bags a-g. A sterile filter 425 connected to pressure sensor 428 which is mounted within the housing is operatively connected via tube 422 to common tube 375 upstream to peristaltic pump 305. A tube 479 passing through sterile filter 474 and pinch valve 361z which is mounted within the housing is connected to common tube 375 downstream to peristaltic pump 305, and also extends to pinch valve 361x through which it also passes. Common tube 375 further extends to a plurality of junctions from each of which corresponding tubes 401, 402, 411 and 412 extend so as to be in fluid communication with biopsy container 303 and to process containers 307a-c, respectively. Although common tube 375 is schematically shown to change direction twice to form two additional segments, the configuration of common tube 375 may have a different physical configuration.

Tube 401 passes through pinch valve 361j, and is connected to inlet flushing tube 371 of biopsy kit 303 by sterile connector 341. Tube 402 passes through pinch valve 361i, and is connected to fitting 395 (FIG. 20) of process container 307a. Tube 411 passes through pinch valve 361h, and is connected to fitting 395 of process container 307b. Tube 412 passes through pinch valve 361g, and is connected to fitting 395 of process container 307c.

Outlet flushing tube 374 of biopsy kit 303 is connected by a sterile connector to tube 434, which passes through pinch valve 361n and is connected to angled inlet fitting 391 (FIG. 20) of process container 307a. Tube 438 connected to angled outlet 343 (FIG. 20) of process container 307a passes through pinch valve 361o to angled inlet fitting 391 of process container 307b. Tube 439 connected to angled outlet 343 of process container 307b passes through pinch valve 361p to angled inlet fitting 391 of process container 307c.

The effluent from process container 307a is pneumatically conveyed through its bottom discharge aperture 346 (FIG. 20) to discharge tube 481 that leads to sample container 309, e.g. with a volume of 30-50 mL, which is configured with slide clamp 358 and sterile sealing and separation means 465, after passing through check valve 445 and pinch valve 361s. The effluent from process container 307b is pneumatically conveyed through its bottom discharge aperture 346 to discharge tube 482 that branches to tube 483 passing through pinch valve 361q and extending to final product bag 310a adapted to hold keratinocytes, e.g. with a volume of 250 mL, which is configured with sterile sealing and separation means 465. Tubes 434, 438 and 439 may be relatively large-sized, e.g. with an inner diameter of 9.5 mm. Discharge tube 482 in turn extends to discharge tube 481 upstream to pinch valve 361s after passing through check valve 446. The effluent from process container 307c is pneumatically conveyed through its bottom discharge aperture 346 to discharge tube 484 that branches to tube 486 passing through pinch valve 361r and extending to final product bag 310b adapted to hold fibroblasts, e.g. with a volume of 250 mL, which is configured with sterile sealing and separation means 465. Discharge tube 484 in turn extends to discharge tube 481 upstream to pinch valve 361s after passing through check valve 448.

Discharge tube 481 is equipped with bubble detection sensor 368 downstream to pinch valve 361s, and branches to tube 487 extending to sample container 309 and to tube 488 extending to waste container 311, which is also configured with means 465. A check valve 455 may be operatively connected to tube 487 downstream to the junction of tubes 487 and 488.

Compressed air is able to be discharged from process container 307a via tube 476 connected to fitting 397 (FIG. 20) and passing through pinch valve 361k and sterile filter 469. Compressed air is able to be discharged from process container 307b via tube 477 connected to its fitting 397 and passing through pinch valve 361l, and from process container 307c via tube 478 connected to its fitting 397 and passing through pinch valve 361m. Tubes 476-8 are in fluid communication with common tube 475, which passes through sterile filter 442 and branches to pinch valves 361u and 361x.

The steps of a typical cell isolation procedure will now be described with respect to a skin sample (biopsy) received by the biopsy kit, with reference to FIG. 28.

It will be appreciated that a cell isolation procedure may be similarly performed in conjunction with compressed gas system 540 of FIG. 27, mutatis mutandis.

The following are the steps of a typical cell isolation procedure for a skin sample with use of cell isolation device 330:

(1) Receiving the skin sample in biopsy kit 303 and connecting the inlet and outlet flushing tubes of the biopsy kit;

(2) Connecting all media bags 304a-g;

(3) Opening pinch valves 361v, 361j and 361n and operating peristaltic pump 305 while all other pinch valves are closed, forcing the skin sample to be pneumatically conveyed by compressed air from biopsy kit 303 to washing container 307a while compressed environmental air at 0.3 bar is supplied by the membrane pump to the gas tank;

(4) While the peristaltic pump remains in operation and the shaker 308 of process container 307a is operated to induce low-frequency vibrations to prevent clogging of the strainer, the liquid in biopsy kit 303 will be flushed via the strainer at the bottom of process container 307a into sample container 309 after pinch valve 361s is opened, and any overflow will be directed to waste container 311;

(5) When bubble detection sensor 368 detects that the fluid flowing through tube 481 has a predetermined low liquid content following bubble detection in the median over time rather than after the appearance of the first bubble, the opened pinch valves are closed to terminate the draining process so that the amount of air in waste container 311 will be reduced;

(6) The user is asked via the user interface to clamp or weld sample container 309;

(7) The user is asked via the user interface whether the skin sample has been sufficiently flushed from biopsy kit 303 to the washing process container 307a, or whether the skin sample needs to be additionally flushed;

(8) Opening pinch valves 361b, 361k and 361i and activating peristaltic pump 305, so that the skin sample will be washed a user specified number of times for a predetermined duration in process container 307a with washing solution and with a defined shaking pattern and time;

(9) When the user indicates in the user interface that the skin sample has been sufficiently flushed, for example, after 8 washing steps, pinch valve 361s is closed before washing solution is introduced for a last time to process contained 307a;

(10) Closing pinch valve 361b, 361k and opening pinch valves, 361v, 361i and 361o so that the skin sample will be pneumatically conveyed by compressed air from washing process container 307a to separation process container 307b;

(11) The user is asked via the user interface whether the skin sample has been sufficiently flushed from process container 307a to process container 307b, and if not step (8) is repeated while shaking process containers 307a and 307b to dislodge any skin pieces;

(12) Closing pinch valve 361o and opening pinch valve 361s so that the liquid will be discharged from the process container to waste container 311;

(13) Closing pinch valve 316s and opening pinch valves 361d, 361l and 361h so that dispase will be added for a user specified duration to separation process container 307b, and then shaking the process container with a defined shaking pattern and time;

(14) The user is asked via the user interface to assess the degree of separation; if a skin piece is not sufficiently separated, the user decides whether the skin piece should be immersed for a longer duration in dispase, an additional shaking operation should be performed to ensure a complete separation, or separation process container 307b should be filled with PBS to perform the actual separation;

(15) After completion of the separation whereby the epidermis is afloat on the surface of the mixture of dispase and PBS and the segregated dermis has accumulated at the bottom of process container 307b onto the strainer, the dermis is forced to be conveyed to the fibroblast isolation process container 307c while the epidermis remains in the separation process container 307b by (i) delivering compressed air to process container 307b when pinch valve 361h is opened and 361l is closed, (ii) reducing the pressure in process container 307c by opening pinch valve 361m, and (iii) producing a fluid path between process containers 307b and 307c by opening pinch valve 361p until approximately half of the liquid mixture has been conveyed due to the pressure differential between containers 307b and 307c and until the container pressures have equalized to terminate the fluid flow;

(16) Step (13) is repeated if a visual observation indicated that the epidermis and dermis have not completely separated;

(17) Closing pinch valves 361h, 361m and 361p and opening pinch valves 361f, 361m and 361g so that the dermis will be immersed in liberase for a user specified duration, and then shaking process container 307c with a defined shaking pattern and time;

(18) Operating the shaker of processor container 307b so that the separation container will be vortexed to loosen epidermis pieces adhering to the container walls, and opening pinch valve 361s so that the liquid mixture in processor 307b will be drained when still in motion and be delivered to waste container 311;

(19) Closing pinch valves 361f, 361m and 361g and opening pinch valves 361e, 361l and 361h so that the epidermis will be immersed in trypsin for a user specified duration, and then shaking process container 307*b* with a defined shaking pattern to facilitate isolation of keratinocytes;

(20) Closing pinch valve 361*e* and opening pinch valve 361*c* so that the trypsin will be inhibited with FBM;

(21) Opening pinch valves 361*q* and 361*y* and close pinch valves 361*l* and 361*c* to flush the keratinocytes with the FBM-inhibited trypsin solution through the strainer of process container 307*b* into final product bag 310*a* for further processing;

(22) Flushing the strainer of process container 307*b* second and third times with FBM to maximize the cell yield of keratinocytes;

(23) Closing pinch valves 361*h* and 361*q* and opening pinch valves 361*c* and 361*m* so that the liberase will be inhibited with FBM;

(24) Opening pinch valves 361*r* and 361*y* and closing pinch valves 361*m* and 361*c* to flush the fibroblasts with the FBM-inhibited liberase solution through the strainer of process container 307*c* into final product bag 310*b* for further processing;

(25) Flushing the strainer of process container 307*c* second and third times with FBM to maximize the cell yield of fibroblasts; and

(26) Closing pinch valves 361*r* and 361*v*.

Other cell isolation procedures may be performed with any of the cell isolation devices described herein for a different sample, such as the isolation of the following cells from the corresponding tissue:

Tenocytes (Tendon fibroblasts) from a tendon;

Mesenchymal stem cells (MSCs) from different sources such as bone marrow and human placenta;

Adipose derived stem cells from fat tissue;

Bone cells (e.g. osteocytes and osteoblasts) from bone; and

Brain cells (e.g. neuronal cells, astrocytes and microglia) from brain tissue, also using DNAse, or in conjunction with different separating or isolating agents, including proteases such as thermolysin, pepsin, hyaluronidase, and matrix metallopeptidase.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. An automatically operable cell isolation device, comprising:
   a) a liquid distribution unit that includes a plurality of separate liquid containers;
   b) a biopsy kit by which a sample of tissue is extractable;
   c) a main disposable unit configured to cooperate with one or more process containers and with a valve array;
   d) one or more final product bags for receiving isolated cells,
      wherein a first portion of said valve array interfaces between said biopsy kit and one of said process containers, a second portion of said valve array interfaces between said liquid distribution unit and said one or more process containers, and a third portion of said valve array interfaces between said one or more process containers and said one or more final product bags, wherein said valve array is configurable to effect a desired cell isolation procedure;
   e) comprising a valve controller for facilitating selective actuation of each valve of the valve array to achieve a desired valve configuration;
   f) means for generating fluid flow and tissue transfer between the biopsy kit and the one or more process containers or between the one or more process containers and the one or more final product bags in conjunction with the desired valve configuration; and
   g) a sequencer module in data communication with the valve controller and the fluid generating means for facilitating selective actuation of each valve of the valve array and of the fluid generating means in each step of a sequence of the desired cell isolation procedure.

2. The cell isolation device according to claim 1, further comprising a software module in data communication with the sequencer module for generating a user interface by which one of a plurality of cell isolation procedure sequences are selectable.

3. The cell isolation device according to claim 1, wherein one of the liquid containers is prefilled with a washing solution, the cell isolation device being operable to flush tissue debris remaining in the biopsy kit, the one or more process containers, or each of the tubes with the washing solution.

4. The cell isolation device according to claim 1, wherein at least one of the liquid containers is prefilled with an isolation agent or with a separation agent.

5. The cell isolation device according to claim 1, further comprising a shaker device that is kinematically connected with a corresponding one of the one or more process containers.

6. The cell isolation device according to claim 5, wherein the shaker device comprises a holder by which the corresponding process container is held, a rod about which said holder is pivotable, an appendage protruding from said holder, and means for applying a driving force to said appendage that causes said holder to rotate in a similar direction about said rod and to shake liquid contained within the corresponding process container.

7. The cell isolation device according to claim 6, wherein the rod is substantially horizontally disposed and is connected to resilient means that induces precessional motion during pivoting displacement of the holder.

8. The cell isolation device according to claim 6, wherein the means for applying a driving force comprises eccentric rotatably driven means protruding through an aperture formed in the appendage, wherein said driven means is configured to forcibly contact a wall of the aperture and to apply the driving force to the appendage.

9. The cell isolation device according to claim 5, further comprising a shaker controller in data communication with both of the shaker device and the sequencer module to facilitate selective operation of the shaker device and to facilitate performance of the desired cell isolation procedure.

10. The cell isolation device according to claim 1, wherein at least one of the liquid containers is an enzyme container; the cell isolation device further comprises at least one climate control chamber within which a corresponding enzyme container is retained throughout the cell isolation procedure; and each of said at least one climate control chambers comprises a Peltier unit for selective temperature control within a climate control chamber interior.

11. The cell isolation device according to claim 5, wherein the shaker device further comprises a contact heater for heating the process container.

12. An automatically operable cell isolation device, comprising:
- a) a liquid distribution unit that includes a plurality of separate liquid containers;
- b) a biopsy kit by which a sample of tissue is extractable;
- c) a main disposable unit configured to cooperate with one or more process containers and with a valve array;
- d) one or more final product bags for receiving isolated cells,
  - wherein a first portion of said valve array interfaces between said biopsy kit and one of said process containers, a second portion of said valve array interfaces between said liquid distribution unit and said one or more process containers, and a third portion of said valve array interfaces between said one or more process containers and said one or more final product bags, wherein said valve array is configurable to effect a desired cell isolation procedure;
  - wherein the main disposable unit comprises a disposable tube system for being in fluid communication with each of the first, second and third portions of the valve array through which liquid discharged from the liquid distribution unit is selectively flowable; and
- e) a housing in which are mounted a plurality of electrical or electronic components including the valve array which are configured to effect the desired cell isolation procedure;
  - wherein the main disposable unit is a carrier in which the tube system is encapsulated and which is adapted to be securely coupled in error-free fashion with a front panel of the housing such that the tube system is set in fluid communication with each of the first, second and third portions of the valve array.

13. The cell isolation device according to claim 12, wherein the main disposable unit comprises a plurality of aseptic connectors, to each corresponding aseptic connector one of the biopsy kit and the liquid containers is connectable.

14. The cell isolation device according to claim 12, wherein the plurality of liquid containers, the one or more process containers, the one or more final product bags, and each tube of the tube system are made of a sterile and biocompatible material.

15. The cell isolation device according to claim 12, wherein the valve array is an array of pinch valves each of which configured with a pinch valve assembly that protrudes forwardly from the housing front panel.

16. The cell isolation device according to claim 15, wherein the pinch valve assembly comprises an abutment and an eccentrically rotating pin to define therebetween an interspace within which a tube of the tube system is restrictedly insertable and pinchable, the tube being insertable simultaneously within the interspace of a plurality of adjacent pinch valve assemblies.

17. The cell isolation device according to claim 16, wherein the pinch valve assembly is self-lockable upon contact between a radial protruding portion and a hard-stop portion when the pin has eccentrically rotated beyond a dead center line.

18. The cell isolation device according to claim 12, wherein the tube system is closed to facilitate aseptic operation of the cell isolation device in a non-sterile environment without risk of contamination.

19. The cell isolation device according to claim 14, wherein the process container comprises a bottom strainer for straining skin pieces during a washing operation or debris during harvesting of isolated cells.

20. A method for automatically performing a cell isolation procedure, comprising the steps of:
- a) providing a housing in which are mounted a plurality of electrical or electronic components configured to effect a desired cell isolation procedure;
- b) securely coupling a carrier, in which a tube system through which one or more isolation agents for isolating extracted tissue is flowable is encapsulated, with the housing, such that the tube system is selectively set in communication by error-free fashion with the plurality of electrical or electronic components after the carrier is coupled with the housing;
- c) introducing a tissue sample into a tube of the tube system;
- d) selecting a desired protocol for performing a cell isolation procedure by means of one of the electronic components; and
- e) performing the cell isolation procedure by sequentially operating the plurality of electrical or electronic components until the one or more isolation agents flows through the tube system and sufficiently acts on the introduced extracted tissue to isolate a cell population residing in the introduced extracted tissue to a single cell level.

21. The method according to claim 20, wherein the one or more isolation agents flows through the tube system which is closed to facilitate aseptic operation of a cell isolation device in a non-sterile environment without risk of contamination.

* * * * *